United States Patent [19]

Burns

[11] Patent Number: 5,381,457

[45] Date of Patent: Jan. 10, 1995

[54] PROGRAMMABLE DENTAL X-RAY INSCRIPTION SYSTEM AND METHOD OF PROCESSING DENTAL INSURANCE CLAIMS USING SAME

[76] Inventor: Carole L. Burns, 55 East Main St., Huntington, N.Y. 11743

[21] Appl. No.: 920,341

[22] Filed: Jul. 24, 1992

[51] Int. Cl.$^6$ .............................................. H05G 1/28
[52] U.S. Cl. .................................. 378/166; 378/165; 378/162
[58] Field of Search ................. 378/165, 166, 168, 99, 378/205, 204

[56] References Cited

U.S. PATENT DOCUMENTS

| | | | |
|---|---|---|---|
| 3,590,244 | 6/1971 | Kullman | 378/165 |
| 3,636,251 | 1/1972 | Daly | 358/297 |
| 3,717,772 | 2/1973 | Engman | 250/235 |
| 3,749,006 | 7/1973 | Loose | 101/3.1 |
| 3,820,455 | 6/1974 | Hencley et al. | |
| 3,846,634 | 11/1974 | Fleming | 378/166 |
| 3,901,369 | 8/1975 | Tsukamoto et al. | 400/131.1 |
| 3,940,864 | 3/1976 | Kanzelberger | 40/616 |
| 3,959,657 | 5/1976 | Katz et al. | 378/166 |
| 3,962,585 | 6/1976 | Huttner et al. | 378/166 |
| 3,962,807 | 6/1976 | Pantone | 40/371 |
| 4,001,592 | 1/1977 | Katz et al. | 378/166 |
| 4,035,653 | 7/1977 | Karasko | 378/165 |
| 4,095,111 | 6/1978 | Katz et al. | 378/166 |
| 4,313,538 | 2/1982 | Bauer et al. | 206/455 |
| 4,373,436 | 2/1983 | Shenoha | 101/27 |
| 4,383,329 | 5/1983 | Krobel et al. | 378/166 |
| 4,507,797 | 3/1985 | Kato | 378/166 |
| 4,679,222 | 7/1987 | Knopp | 378/166 |
| 4,739,480 | 4/1988 | Oono et al. | 378/166 |
| 4,764,948 | 8/1988 | Hurwitz | 378/165 |
| 4,928,298 | 5/1990 | Tanaka | 378/162 |
| 4,961,086 | 10/1990 | Takenaka | 355/41 |
| 4,972,323 | 11/1990 | Cauwet | 364/474.29 |
| 4,985,780 | 1/1991 | Garnier et al. | 358/299 |
| 4,995,501 | 2/1991 | Lundstrom et al. | 198/341 |
| 5,034,974 | 7/1991 | Yuroski | 378/166 |
| 5,088,864 | 2/1992 | Yanagida | 409/96 |
| 5,127,033 | 6/1992 | Yurosko | 378/204 |
| 5,136,626 | 8/1992 | Ort | 378/165 |
| 5,148,464 | 9/1992 | Metoki | 378/165 |
| 5,179,579 | 1/1993 | Dove et al. | 378/165 |
| 5,195,123 | 3/1993 | Clement | 378/166 |

FOREIGN PATENT DOCUMENTS 270178  1/1977  Germany .

OTHER PUBLICATIONS

"Product Brochure of PM 2002 CC Computerized Film Marking System", by Planmeca, Inc. of Wood Dale, Illinois.

"A Computer-Programmable Laser Engraving System and Its Applications" by James H. Mason of Contro Laser Corp, Orlando Florida, published in the Proceedings of the Technical Program International Microelectronics Conference, Feb. 24, 1981, Anaheim, Calif., U.S.A. and New York, N.Y., USA.

"Computer-Controlled Laser Engraving of Labels and Serial Numbers on Commercially Manufactured Products" by William Adair, et al. published in IBM Technical Disclosure Bulletin vol. 27, No. 4A, Sep., 1984.

*Primary Examiner*—David P. Porta
*Assistant Examiner*—Kim-Kwok Chu
*Attorney, Agent, or Firm*—Hopgood, Calimafde, Kalil & Judlowe

[57] ABSTRACT

A programmable dental x-ray inscription system is disclosed for use in physically inscribing developed dental x-rays with patient identifying indicia representative of the identity of the patient, the esposure date of the dental x-ray, the tooth numbers of teeth represented in the x-ray and other related information. The physical inscriptions have a depth dimension into the developed dental x-ray. The programmable dental x-ray inscription system includes a housing which is positionable on a work surface such as a desk or countertop. During the programming cycle of the system, the user places a developed dental x-ray within the projected support tray of the system, which is thereafter retracted within the housing. Then during the programming cycle, user-directed prompts and queries are displayed on the display panel of the system so that the user selects a suitable inscription field and enters data representative of desired patient identifying indicia. Thereafter, the patient identifying indicia is automatically inscribed within the selected inscription fields of the dental x-ray. In the illustrative embodiment, the physical inscription process is achieved using a laser beam generated and scanned within the housing of the system.

49 Claims, 27 Drawing Sheets

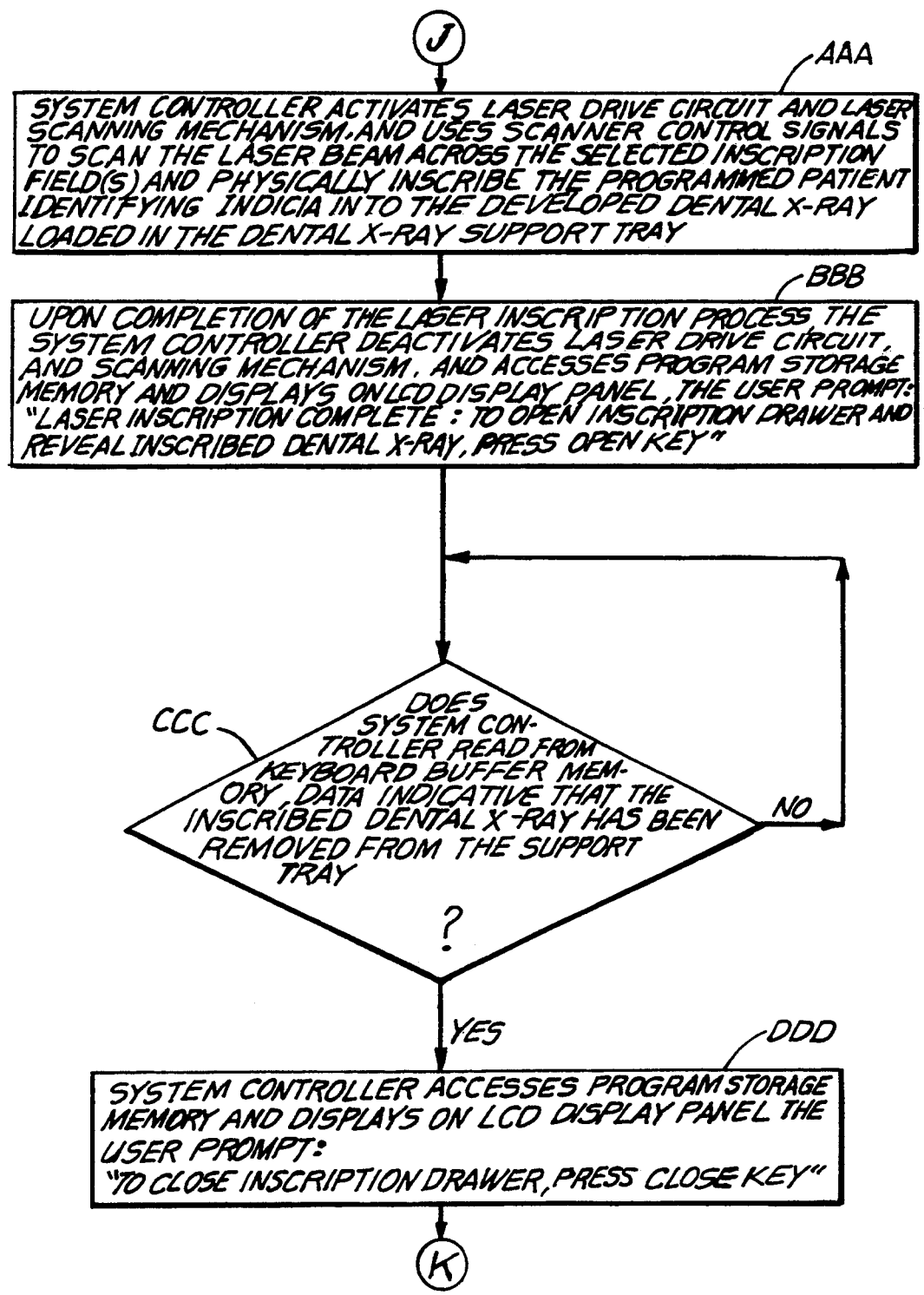
FIG. III

PROGRAMMABLE DENTAL X-RAY INSCRIPTION SYSTEM AND METHOD OF PROCESSING DENTAL INSURANCE CLAIMS USING SAME

BACKGROUND OF THE INVENTION

1. Field of Invention

The present invention generally relates to automated x-ray marking systems, and more particularly to a programmable dental x-ray inscription system which facilitates permanent marking of developed dental x-rays with patient identifying indicia and other information useful in patient record management and dental insurance claim processing.

2. Brief Description of the Prior Art

The use of x-ray photographs is a long established practice in the dental art. The reason for this is quite clear. Dental x-ray photographs (hereinafter "dental x-rays") provide high-definition visible images of the internal structure of a patient's teeth, permitting early identification of cavities, tooth decay, and other dental diseases which otherwise are not visible to the unaided eye of the dentist. Consequently, the use of dental x-rays in the field of dentistry has become a standard practice, and in many instances, required prior to conducting particular procedures such as, for example, root canal, apicoectomy and extraction.

As with most technological innovations, the social impact of dental x-rays has extended beyond those who primarily use them, namely dentists and oral surgeons. For example, when a patient having dental insurance or a dentist accepting insurance assignment for services rendered, submits a dental claim to the patient's insurance carrier, the insurance carrier typically requires the attending dentist to send dental x-rays taken of those teeth involved in the dental claim. This dental x-ray reporting procedure involves mailing a set of developed dental x-rays from the dentist's office to the insurance company's claim department. Typically, these dental x-rays are held in a dental x-ray folder having slots within which periapical size dental x-rays are held. During this procedure, however, a number of problems frequently occur.

For example, one problem is that in the claims department of the insurance company, the dental x-rays of one patient are often mistaken for the dental x-rays of another patient. This occurs primarily because most dental x-rays are typically unmarked as to patient identity and date of exposure, and also because the developed dental x-rays within dental folders frequently dental fall out during handling and mailing. Consequently, at both the dentist office and dental insurance claim department, dental x-rays are frequently dated incorrectly, mishandled or placed in wrong patient charts or wrong dating envelopes. Thus, when clerks at the insurance company attempt to process submitted dental insurance claims, they are often unable to identify which dental x-rays belong to which patient. Consequently, the claim clerks must frequently request a second set of dental x-rays, causing added expense in claim processing, and further delay in payments to dentists and patients alike.

In an effort to avoid the above-described problems within dental offices and claim departments of insurance companies, a number of prior art approaches have been proposed for marking dental x-rays.

One prior art approach has been to use pens, stickers or labels to mark developed dental x-rays with the name of the patient and the date of exposure of the x-ray. However, such a dental x-ray marking technique suffers from a number of significant shortcomings and drawbacks. In particular, the pen markings on the dental x-ray often smear, and patient identification stickers and labels are easily removed and replaced with new stickers or labels containing false information. Consequently, false dental claim submissions can be easily corroborated using this dental marking technique.

An alternative approach to marking dental x-rays has been proposed in U.S. Pat. Nos. 5,034,974 to Yurosko and 3,846,634 to Fleming. In both of these U.S. Letters Patents, a method is disclosed for photographically marking dental x-ray film with patient identifying indicia, using a light transparent card or band in conjunction with an identification camera. To photographically imprint patient identifying indicia on a selected portion of an exposed dental x-ray, the patient identifying indicia is either typed or written onto the light transparent card. Then, the card is registered with a selected portion of the exposed dental x-ray on which the patient identifying indicia is to be printed. The exposed dental x-ray and card are then loaded into the identification camera, and only a selected portion of the dental x-ray, where imprinting is desired, is exposed to intense light. Thereafter, the exposed dental x-ray is unloaded from the identification camera, the card removed, and the exposed dental x-ray developed using a conventional photographic development process. The result is a dental x-ray which bears a permanent marking indicating the identity of the patient and the date of exposure of the x-ray. While the above-described U.S. Letters Patents disclose a way and means to permanently mark exposed dental x-rays, this prior art approach suffers from significant shortcomings and drawbacks. In particular, this technique is manually intensive, time-consuming and generally prone to errors in marking. In addition, it involves handling exposed dental x-ray photographs during the photographic marking process, and thus requires working in a dark-room environment.

Thus, there is a great need in the dental art and insurance industry for a method and apparatus for permanently marking developed dental x-rays with patient identifying indicia, while overcoming the shortcomings and drawbacks associated with prior art methodologies and apparatus.

OBJECTS OF THE PRESENT INVENTION

Accordingly, it is a primary object of the present invention to provide a portable, stand-alone, programmable dental x-ray inscription system for permanently inscribing patient identifying indicia on a selected portion of a developed dental x-ray, in a fully automated manner.

Another object of the present invention is to provide such a programmable dental x-ray inscription system, in which the developed dental x-ray to be inscribed is loaded into a dental x-ray support tray, preselected patient identifying indicia is programmed into memory, and thereafter physical inscriptions corresponding to the programmed patient identifying indicia are automatically formed into the developed dental x-ray, without adversely affecting the developed x-ray image thereof.

An even further object of the present invention is to provide such a programmable dental x-ray inscription system, in which physical inscriptions of the programmed patient identifying indicia are formed in the developed dental x-ray using a laser beam generated and scanned within the housing of the system.

An even further object of the present invention is to provide such a programmable dental x-ray inscription system, in which a periapical, palate or panoramic size developed dental x-ray is loaded into a designated mounting recess within a support tray disposed in a protracted loading position, then the support tray is transported to a retracted inscription position within the housing of the system, and thereafter the developed dental x-ray physically inscribed within the housing.

An even further object of the present invention is to provide such a programmable dental x-ray inscription system, in which the programming of patient and dental information into the system is facilitated by a menu-driven computer program which visually displays user directed prompts and queries along each step of the programming cycle.

An even further object of the present invention is to provide such a programmable dental x-ray inscription system, in which the user loads a developed dental x-ray into a designated mounting recess of a dental x-ray support tray, and is then permitted to program a desired inscription field which defines a selected perimetrical border region of the developed dental x-ray, within which programmed patient identifying indicia is to be physically inscribed, thereby minimizing adverse effects to the developed x-ray image.

Yet a further object of the present invention is to provide a novel method of physically inscribing developed dental x-rays with permanent markings indicative of the patient's identity, the exposure date of the x-ray, the dentist's identity, and the particular teeth depicted in the developed x-ray image.

A further object of the present invention is to provide a novel method of inscribing developed dental x-rays at a dental office using a portable, stand-alone, programmable inscription device, and identifying physically inscribed dental x-rays at a dental claim processing department of an insurance company, using bar code symbol reading technology.

An further object of the present invention is to provide a novel method of processing dental insurance claims using a portable, stand-alone, programmable dental inscription device located at a dental office, and a computer workstation with a bar code symbol reading device located at the dental claim processing department of an insurance company.

These and further objects of the present invention will become apparent hereinafter and in the claims.

SUMMARY OF THE INVENTION

According to one of the broader aspects of the present invention, a programmable dental x-ray inscription system is provided. In general, the programmable dental x-ray inscription system comprises a portable housing positionable on a worksurface, data storage means, data input means, display means, physical inscription forming means, and control means, all being disposed within the housing. The data storage means is provided for storing data representative of selected indicia identifying a patient and the exposure date of a developed dental x-ray. The developed dental x-ray has a central region containing an x-ray image of one or more teeth of a patient and a perimeterical border region disposed about the central region. The data input means is provided for programming selected patient identifying indicia data into the data storage means, whereas the display means is provided for displaying the selected patient identifying indicia. The physical inscription forming means is provided for forming, in a portion of the perimeterical border region, physical inscriptions which correspond to the selected patient identifying indicia. The control means is operably associated with the data storage means, data input means, display means and physical inscription forming means, and has at least two principal functions. The first function is to cause the display means to display the selected patient identifying indicia. The second function is to control the operation of the physical inscription forming means in order to form physical inscriptions only within the predesignated portion of the perimetrical border region, and without adversely affecting the x-ray image in the central region.

In the illustrative embodiments, the physical inscription forming means is realized as a laser beam inscription mechanism which physically inscribes the selected patient identifying indicia in the developed dental x-ray and at a controlled depth. In addition, the system includes a dental x-ray support tray which projects from the housing so as to permit the user to insert either a panoramic size dental x-ray, a palate size dental x-ray or a pair of periapical size dental x-rays into designated recesses, and thereafter is retracted within the housing for laser inscription.

In the illustrative embodiments, user-system interaction is orchestrated in accordance with a menu-driven program which displays user prompts and queries during the programming cycle of the system. While developed dental x-ray is placed within the support tray, the user may select a desired inscription field within which selected patient identifying indicia is to be inscribed. Advantageously, this feature permits the user to exercise judgment where inscription is to occur, in order to minimize adverse effects to the x-ray image, which oftentimes extends outwardly from the central region into the perimetrical border region of the dental x-ray.

In an alternative embodiment of the present invention, the programmable dental x-ray inscription system is interfaced with a host computer system equipped with suitable programming software, so as to permit data entry and programming operations to be carried out through the host computer system.

According to another aspect of the present invention, a method of processing dental insurance claims is provided in which the portable programmable dental x-ray inscription system of the present invention is utilized. In accordance with this method, dental x-rays are physically inscribed with patient identifying indicia using the programmable dental x-ray inscription. Preferably, the patient identifying indicia includes one or more bar code symbols representative of the patient's identity, and ideally the exposure or development date of the dental x-ray. Physically inscribed dental x-rays of the patient's teeth are transferred to the clerk assigned to the processing of a submitted dental insurance claim by the patient or the dentist thereof. The identity of the physically inscribed dental x-ray is verified by reading the bar code symbol using bar code symbol equipment which, in the preferred embodiment, automatically accesses from a computer system, the dental insurance file of the patient whose identity has been verified. Using the method of the present invention, processing dental insurance claims is expedited and costs involved therein substantially reduced.

According to another aspect of the present invention, a dental x-ray organizing/holding tray is provided. In general, the tray includes first and second sets of slots, each being adapted to hold periapical size dental x-rays. The tray can be used to organize undeveloped dental x-rays during the x-ray exposure process, as well as developed during the physical inscription process when using the programmable dental x-ray inscription system of the present invention.

BRIEF DESCRIPTION OF THE DRAWINGS

For a more complete understanding of the objects of the present invention, the following Detailed Description of the Illustrative Embodiments of the invention is to be taken in conjunction with the drawings, wherein:

FIGS. 11A through 11J, taken together, provide a detailed flow chart of the System Control Program carried out by the system controller of the dental x-ray inscription system of the first illustrative embodiment;

DETAILED DESCRIPTION OF THE ILLUSTRATIVE EMBODIMENT OF THE PRESENT INVENTION

Referring to FIGS. 1 through 11J, the programmable dental x-ray inscription system according to the first illustrative embodiment of the present invention, will be described.

Figure 1:
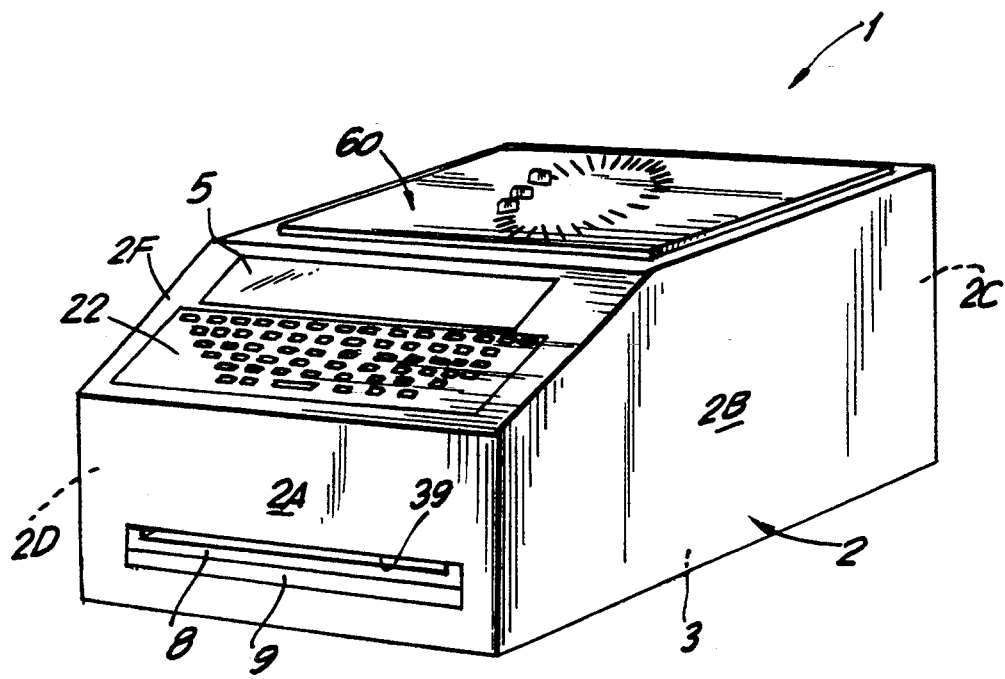
FIG. 1 is a perspective view of the first illustrative embodiment of the portable, stand-alone, programmable dental x-ray inscription system of the present invention, showing the inscription platform retracted within the housing, and the dental x-ray organizing tray mounted atop of the dental x-ray inscription system.
Figure 2:
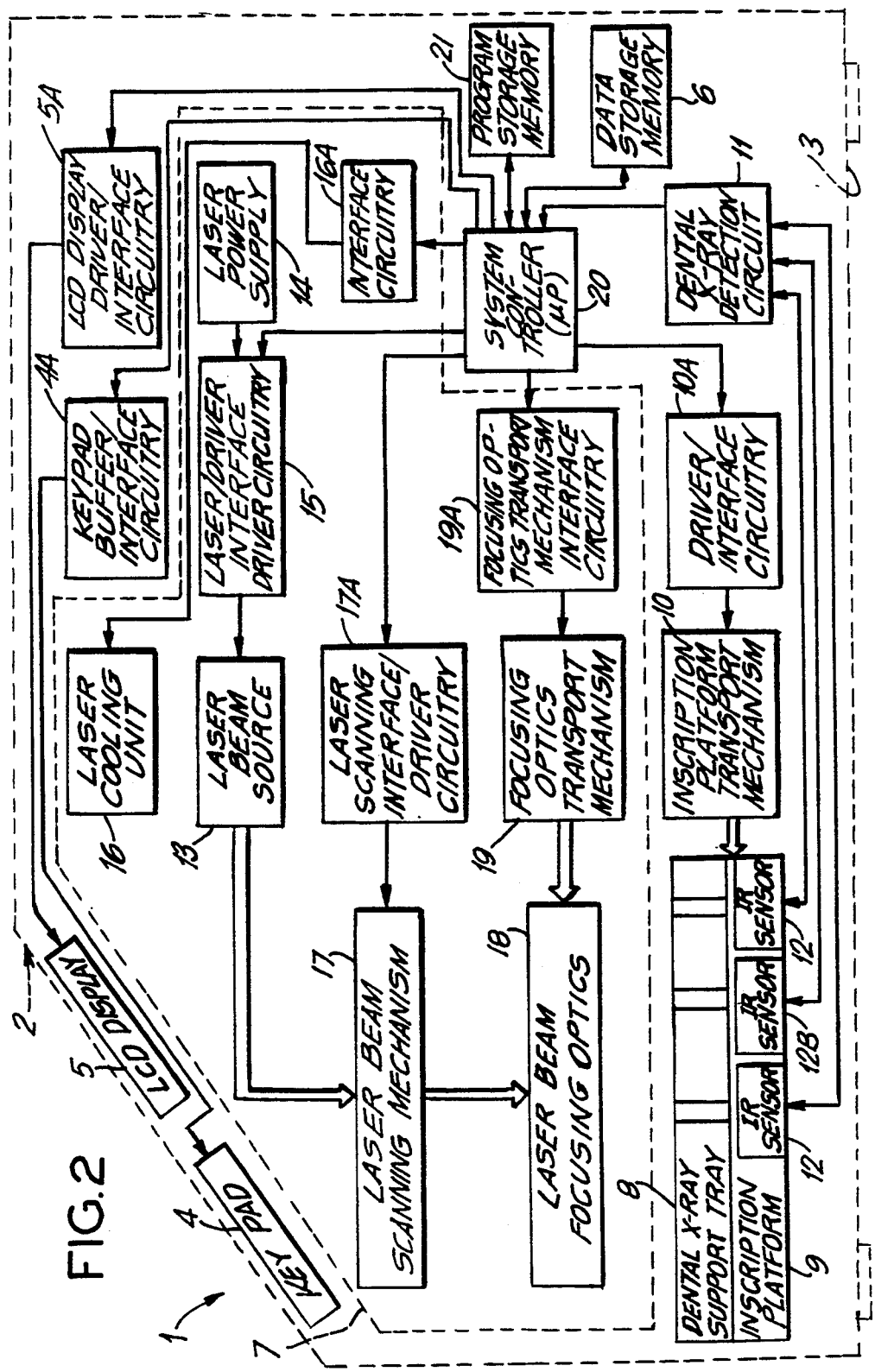
FIG. 2 is a block functional system diagram of the first illustrative embodiment of the dental x-ray inscription system of the present invention.
Figure 3:
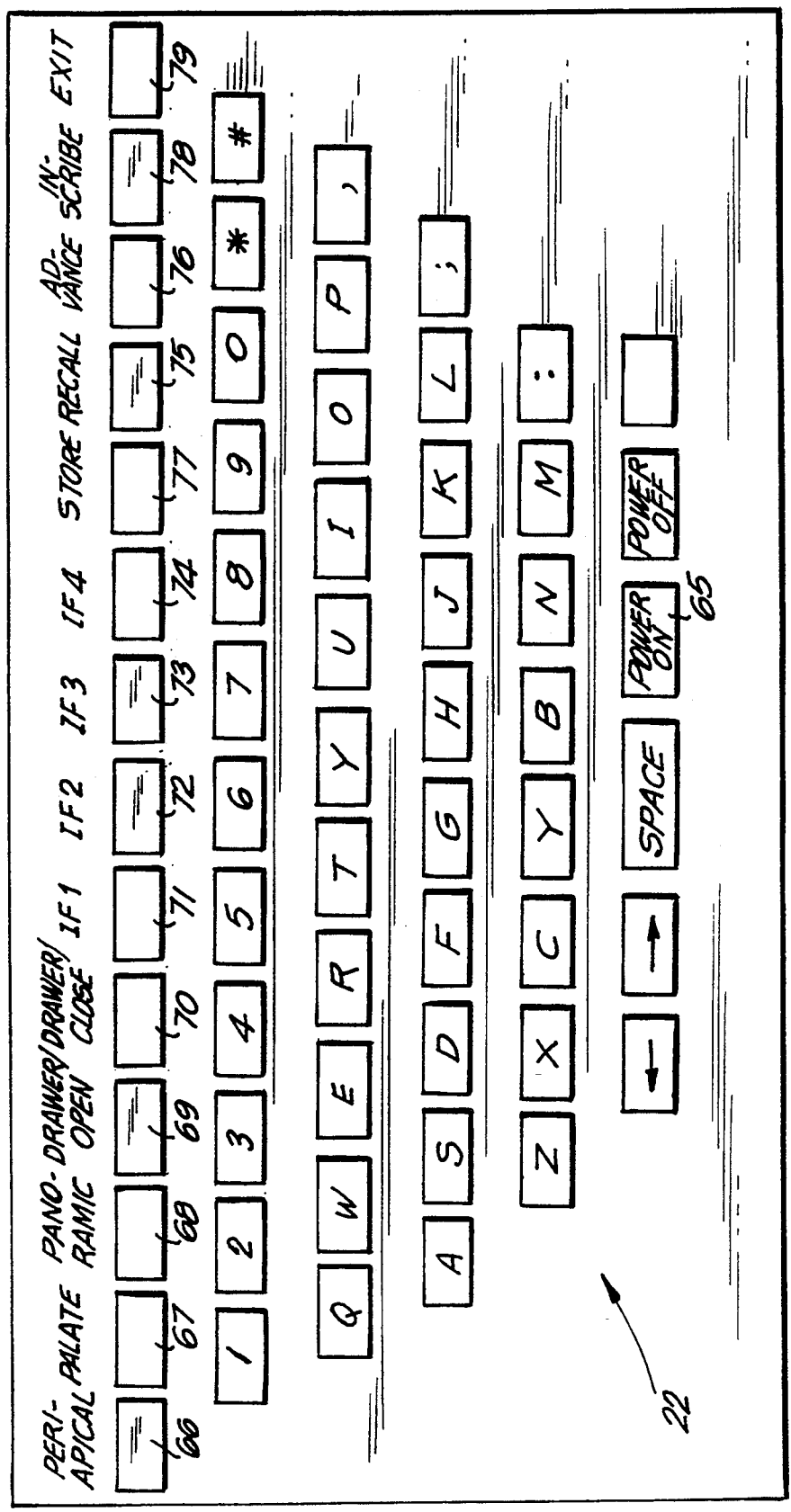
FIG. 3 is a plan view of the keyboard panel of the dental inscription system of the present invention shown in FIGS. 1 and 1A.

As illustrated in FIGS. 1 through 2A, programmable dental x-ray inscription system I comprises a compact housing 2 having a footprint sufficiently small for placement upon a counter or desktop. As shown, housing 2 has side walls 2A, 2B, 2C, and 2D, console panel wall 2E, and top wall 2F. Preferably, the housing is formed as a molded shell which is mounted to a base 3 functioning as a chassis from which the system components are mounted, as will be described in greater detail hereinafter.

As illustrated in FIG. 2, programmable dental x-ray inscription system 1 generally comprises a number of system components, namely: a data entry and control function selection means 4 and associated buffer/interface circuitry 4A; a visual display device 5 and associated driver/interface circuitry 5A; programmable data storage memory 6 (e.g. RAM or EEPROM); a physical inscription forming mechanism 7; a removable dental x-ray support tray 8; an inscription platform 9, a horizontal transport mechanism 10 therefor and associated driver/interface circuitry 10A; and dental x-ray detection circuitry 11 having panoramic, palate and periapical dental x-ray sensors 12A, 12B and 12C, respectively. In the illustrative embodiments to be described in great detail hereinafter, physical inscription forming means 7 is realized as a laser inscription mechanism comprising a number of subcomponents, namely: a laser beam producing source 13, a laser power supply 14 and associated driver/interface circuitry 15; a laser cooling unit 16 and associated interface circuitry 16A; a laser beam scanning mechanism 17 and associated driver/interface circuitry 17A; laser beam focusing optics 18, a vertical transport mechanism therefor 19 and associated driver/interface circuitry 19A.

As shown, each of these system components are operably associated with a system controller 20, preferably realized as a microprocessor having associated program memory 21 for storing (i) a System Control Program (e.g. expressed in microcode), and (ii) video data associated with user queries and prompts which are visually displayed during the programming cycle of the dental x-ray inscription system, to be described in great detail hereinafter. In order to avoid obfuscation of the present invention, external timing circuitry and power distribution circuitry (not shown) are provided in a manner well known in the art. As will be described in greater detail hereinafter, the operation of these system components is controlled in accordance with the System Control Program carried out by the system controller.

As illustrated in FIGS. 1, 2, 3, 4 and 5, data entry and control function selection device 4 is preferably realized as an alphanumeric keyboard panel 22 having a conventional alphanumeric key arrangement and various control function selection keys, which will be described hereinafter. Preferably, alphanumeric keyboard is formed using membrane switching technology well known in the art, so that a low-profile operating console is provided at the surface level of panel 2F of the compact housing. As shown in FIG. 2, buffer/interface circuitry 4A is operably connected between keyboard panel 22 and the system controller and includes, inter alia, keyboard buffer memory 23. As will be described in greater detail hereinafter, keyboard buffer memory 23 is periodically accessed by system controller 20 in order to determine whether data has been entered by the user or a control function has been selected at particular stage along the programming cycle of the dental x-ray inscription system.

In the preferred embodiment, visual display device 5 is mounted above keyboard panel 22, and is realized using LCD technology well known in the art, to provide a high-definition visual display panel capable of displaying preselected alphanumeric characters, user queries, prompt instructions and other graphical displays presented during the programming cycle of the dental x-ray inscription system. Notably, suitable driver/interface circuitry 4A will be selected for the particular LCD technology selected, in order to interface the LCD display panel with the system controller.

In the preferred embodiment, programmable data storage memory 6 is realized using Random Access Memory (RAM) or Electronically Erasable Programmable Read Only Memory (EEPROM) technology in order to provided non-volatile data storage capabilities to the system. In the illustrative embodiment of the present invention there are principally three different types of data to be programmed (i.e. stored) in data storage memory 6, namely: (i) patient identifying data, (ii) x-ray size selection data, and (iii) inscription field selection data, each of which are generated by keyboard 22 during a programming cycle. In accordance with the present invention, patient identifying data typically will include data representative of (1) alphanumeric characters selected by the user to identify a patient, and optionally his or her dentist, (2) the exposure date of a developed dental x-ray, and (3) the standard tooth number(s) which identify the teeth depicted in the dental x-ray. As will be discussed in greater detail hereinafter, each developed dental x-ray has a central region containing an x-ray image of the patient's teeth, and a perimetrical border region about the central region. Both x-ray size selection data and inscription field selection data are used by the System Controller to set the "flags" corresponding to particular user selections. For example, in the illustrative embodiment, x-ray size selection data is used to set a flag within the System Control Program, representative of the physical size of the developed dental x-ray, which in the illustrative embodiment, may be a panoramic size dental x-ray, a palate size dental x-ray or a periapical size dental x-ray. Inscription field data on the other hand, is used to set a flag within the System Control Program, representative of a selected inscription field defined along the perimetrical border region of the developed dental x-ray. As will be described in greater detail hereinafter, the selected inscription field shall determine where physical inscriptions (corresponding to the selected patient identifying indicia) on the developed dental x-ray are to be formed.

Figure 4:
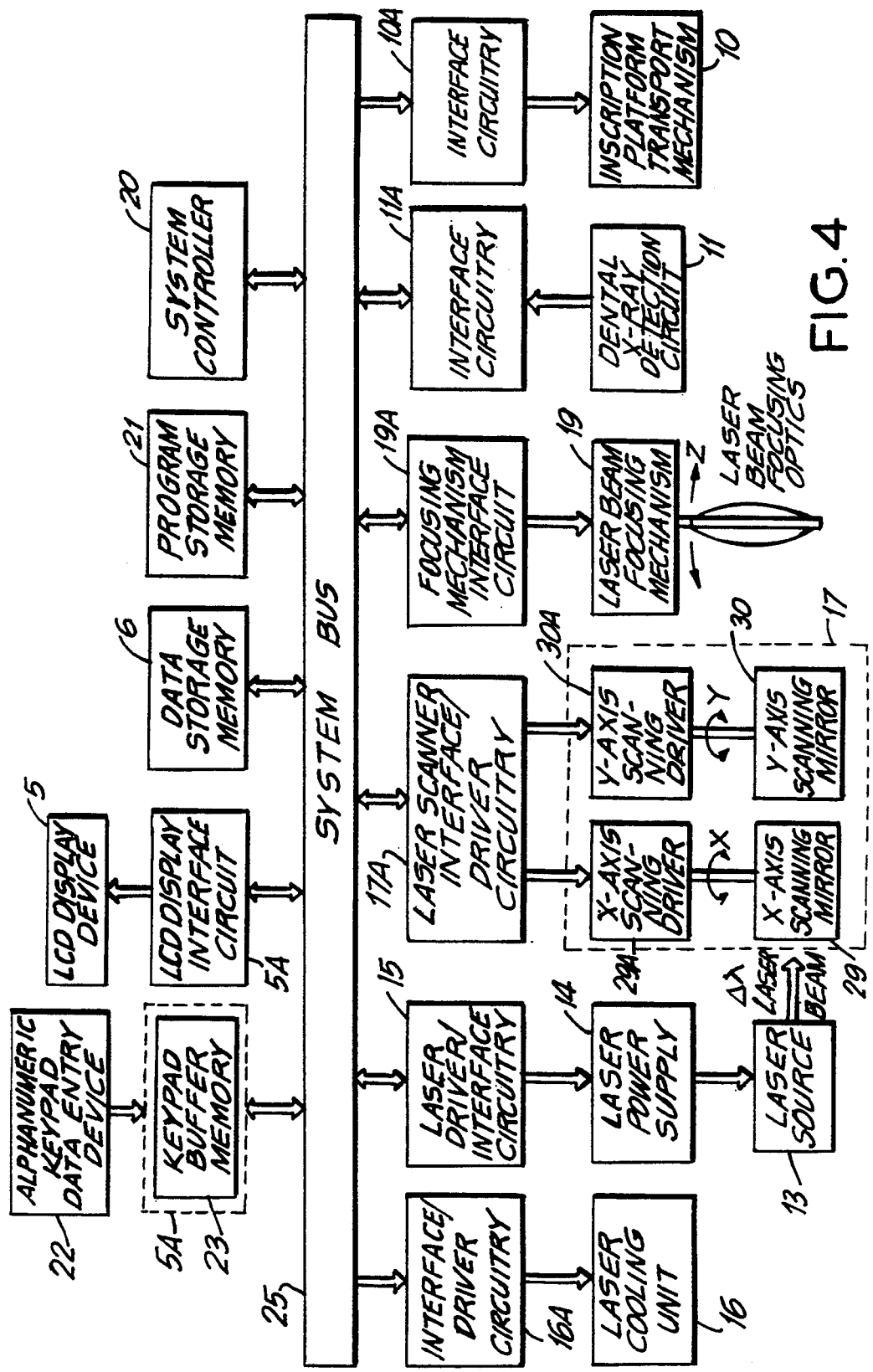
FIG. 4 is a block schematic diagram of the first illustrative embodiment of the dental x-ray inscription system of the present invention.

In FIG. 4, a schematic diagram is provided for a physical implementation of the programmable dental x-ray inscription system of the present invention. As illustrated, all system components are operably connected with system controller 20 by way of a system bus 25. As is well known in the computing art, system bus 25 comprises a data bus, an address bus, and control lines necessary for transferring data bytes and control signals within the system, as orchestrated by the system controller. Expectedly, the width of the data and address buses will vary from embodiment to embodiment. As shown in FIG. 2, keyboard 22, LCD display panel 5, laser cooling unit 16, laser beam source 13, laser scanning mechanism 17, laser beam focusing mechanism 19, dental x-ray detection circuit 11, and inscription platform transport mechanism 10, are each interfaced with the system bus by way of interface circuitry 4A, 5A, 16A, 15, 17A, 19A, 11A, and 10A, respectively. Preferably, such interface circuitry, data storage memory 6, program storage memory 21, dental x-ray detection circuit 11 and system controller 20 are implemented on one or more electronic circuit boards mounted to chassis 3, which is enclosed within housing 2. In addition, a power supply and power distribution circuitry (not shown) will also be mounted within the housing in a manner well known in the art.

In accordance with the present invention, laser beam source 13 may be realized by any solid state or gaseous lasing device, such as, for example, a far-infrared (e.g. a Q switched ND:YAG) laser or a far-ultraviolet (Argon-ion) laser, adapted to produce either continuous or pulsed laser output. All necessary operating power, current regulation and triggering functions for the laser are provided by laser power supply 14, with interface circuitry 15 serving as an interface between the laser power supply and the system bus. Typically, a high-speed electronic shutter (not shown) is provided to selectively pass the laser beam to the laser scanning mechanism, and a photodiode energy sensor (not shown) is provided in order to monitor the power density of the laser output beam. In the illustrative embodiment, laser cooling unit 16A is realized as a heat exchanger or blower fan, in order to maintain the temperature of the laser with safe operating limits.

Figure 7:
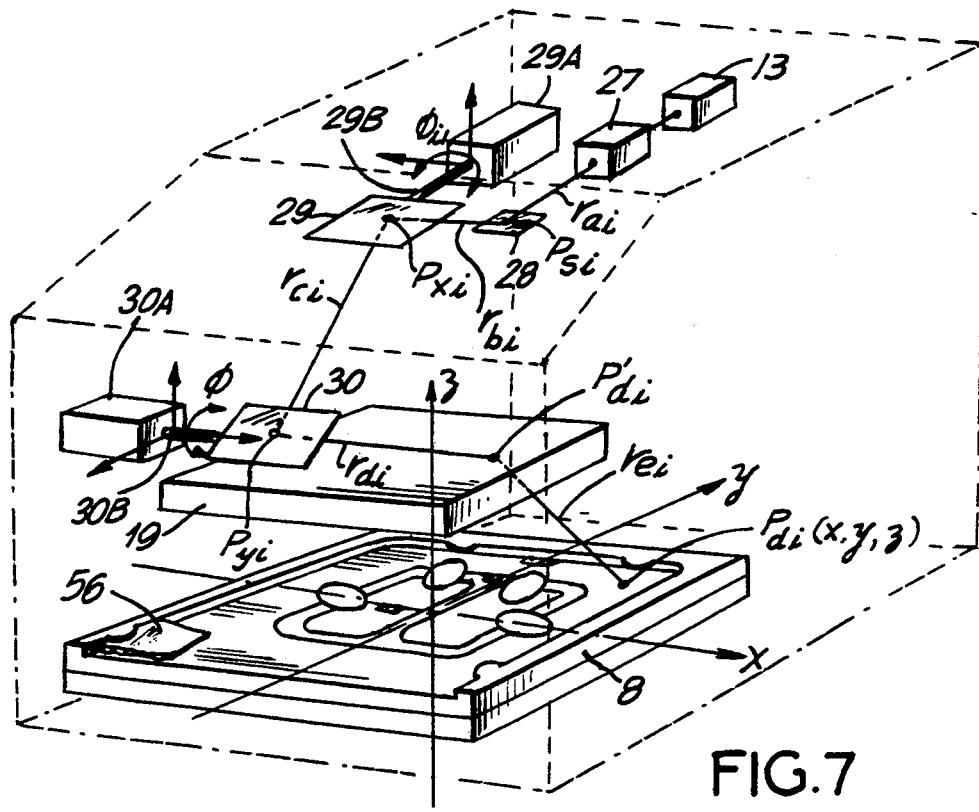
FIG. 7 is a perspective, partially phantom view of the dental x-ray inscription system of the present invention, showing a three-dimensional Cartesian coordinate system embedded within the dental x-ray support tray while retracted within the housing, so as to define a plurality of inscription fields for selection by the user when programming the system for inscription of a panoramic size dental x-ray.

In order to scan the produced laser beam across a selected inscription field, the laser beam is directed towards laser beam scanning mechanism 17. As illustrated in FIGS. 4 and 7 in particular, the laser beam scanning mechanism of the illustrative embodiment comprises a collimator lens system 27, stationary mirror 28, x-axis and y-axis scanning mirrors 29 and 30 rotatably driven by galvanometric motors 29A and 30A, respectively, for scanning the laser beam along the x and y coordinates axes of dental x-ray support tray 8. As will be described in greater detail hereinafter, scanner control signals generated by the system controller are provided to driver/interface circuitry 17A which, in turn, generates scanner drive signals which drive the galvanometric motors 29A and 30A so that the laser beam is scanned only within the user selected inscription field of the dental x-ray in the support tray, forming physical inscriptions of patient identifying indicia.

Figure 8:
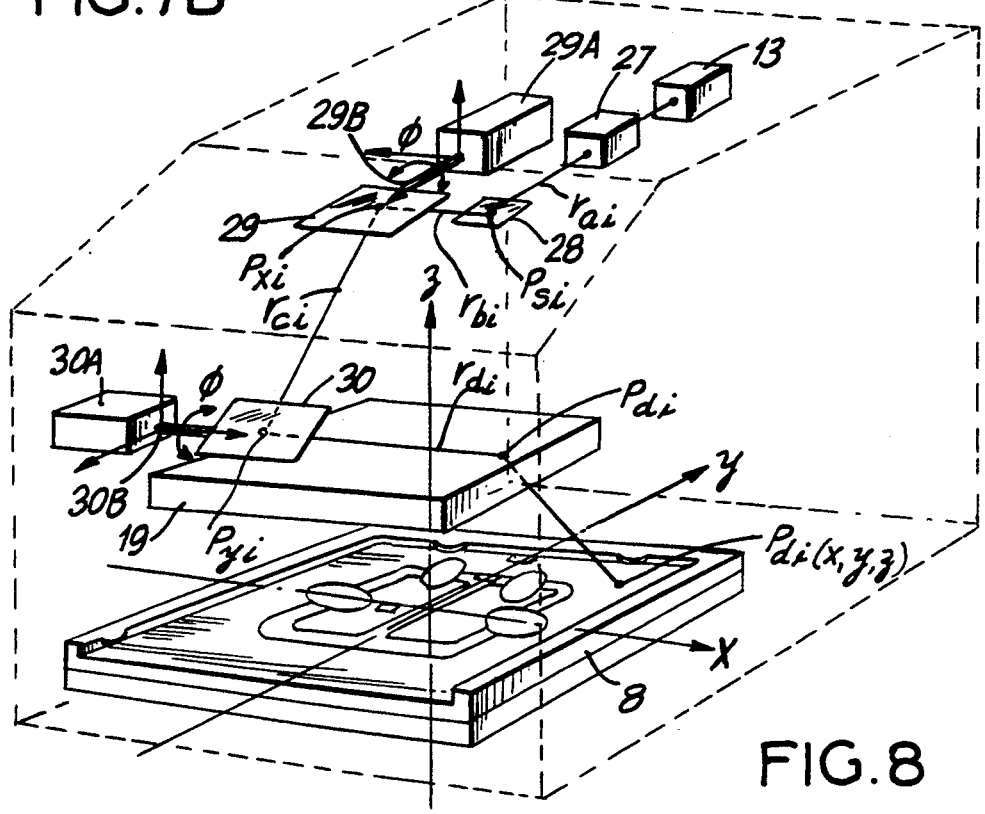
FIG. 8 is a perspective, partially phantom view of the dental x-ray inscription system, showing a three-dimensional Cartesian coordinate system embedded within the dental x-ray support tray retracted within the housing, so as to define a plurality of inscription fields for selection by the user when programming the system for inscription of a palate size dental x-ray.
Figure 9:
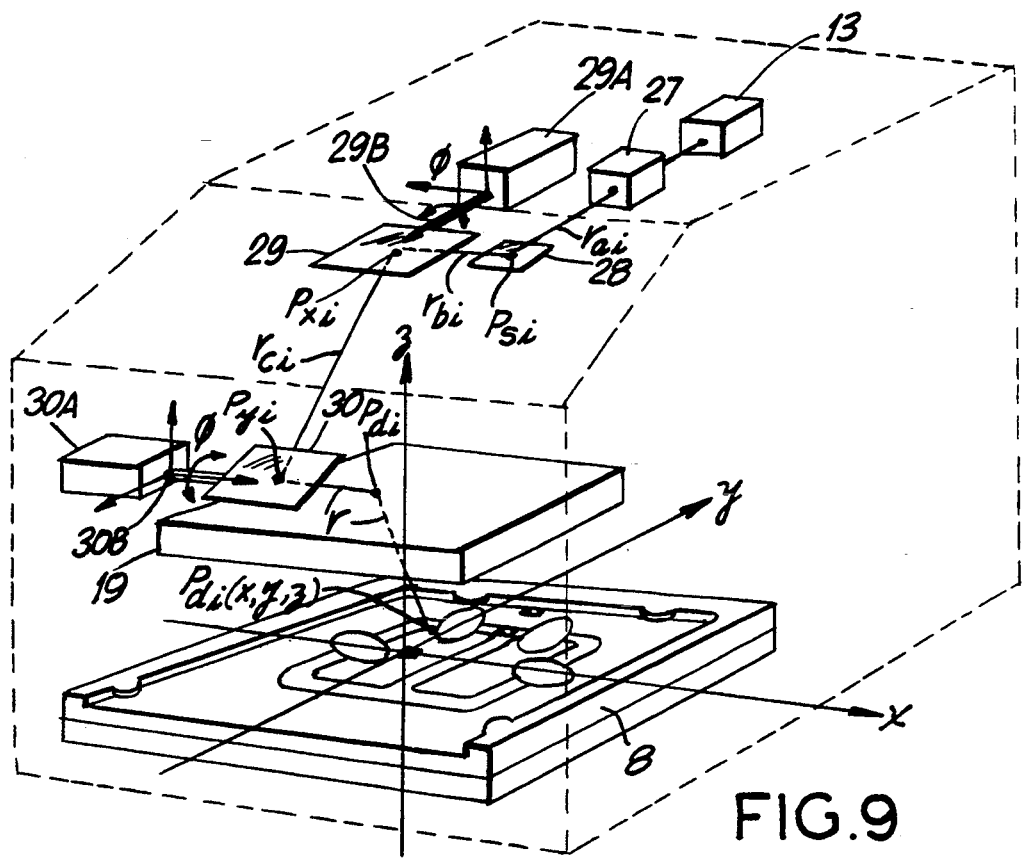
FIG. 9 is a perspective, partially phaeton view of the dental x-ray inscription system, showing a three-dimensional Cartesian coordinate system embedded within the dental x-ray support tray retracted within the housing, so as to define a plurality of inscription fields for selection by the user when programming the system for inscription of a periapical size dental x-ray.
Figure 9A:
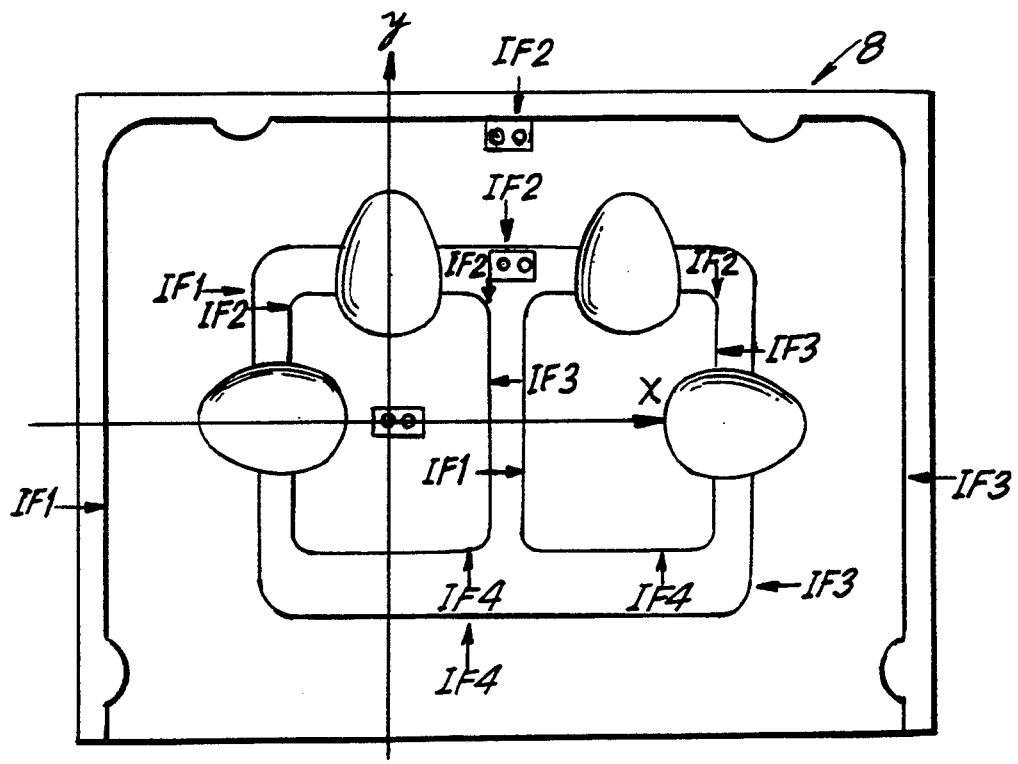
FIG. 9A is a plan view of the dental x-ray support tray and the embedded Cartesian coordinate system of FIG. 9, without a periapical size dental x-ray supported therein.

Laser beam focusing system 19 is provided between the laser beam scanning mechanism and the dental x-ray support tray, in order to focus the scanned laser beam to a desired cross-sectional dimension within the plane of the upper surface of the dental x-ray in the support tray. In the illustrative embodiment, laser beam focusing system 19 comprises a multi-element flat-field focusing lens and a lens projector, encased within a tubular enclosure. To achieve different degrees focusing along a direction perpendicular to each sized dental x-ray mounted within support tray 8, the encased optical elements of the laser beam focusing system are vertically translatable above the support tray by way of vertical transport mechanism 19, which is interfaced with the system bus by way of driver/interface circuitry 19A. In the illustrative embodiment, transport mechanism 19 comprises a support fixture which supports the encased focusing optics above the dental x-ray support tray, when the support tray is retracted within the housing, as shown in FIGS. 7, 8 and 9. This vertically translatable support fixture is operably connected to a stepper motor so that when the stepper motor is driven by driver/interface circuitry 19A under the control of the system controller, the position of the encased focusing optics can be adjusted above the dental x-ray support tray to at least three different positions. In this way, the scanned laser beam can be focused to at least three different planes within which the three different sized dental x-rays rest in the dental x-ray support tray during the dental x-ray inscription process.

Figure 1A:
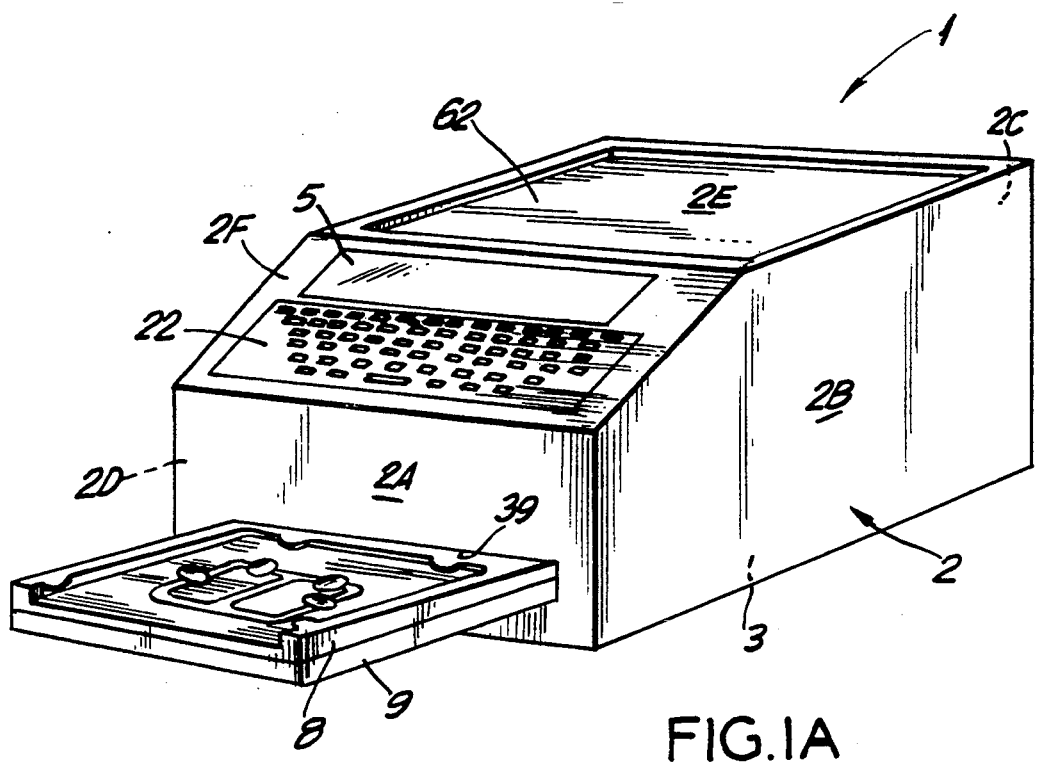
FIG. 1A is a perspective view of the dental x-ray inscription system of FIG. 1, showing the dental x-ray organizing tray removed from the dental x-ray inscription system, and the inscription platform protracted outwardly from the housing presenting the dental x-ray support tray for loading.
Figure 5:
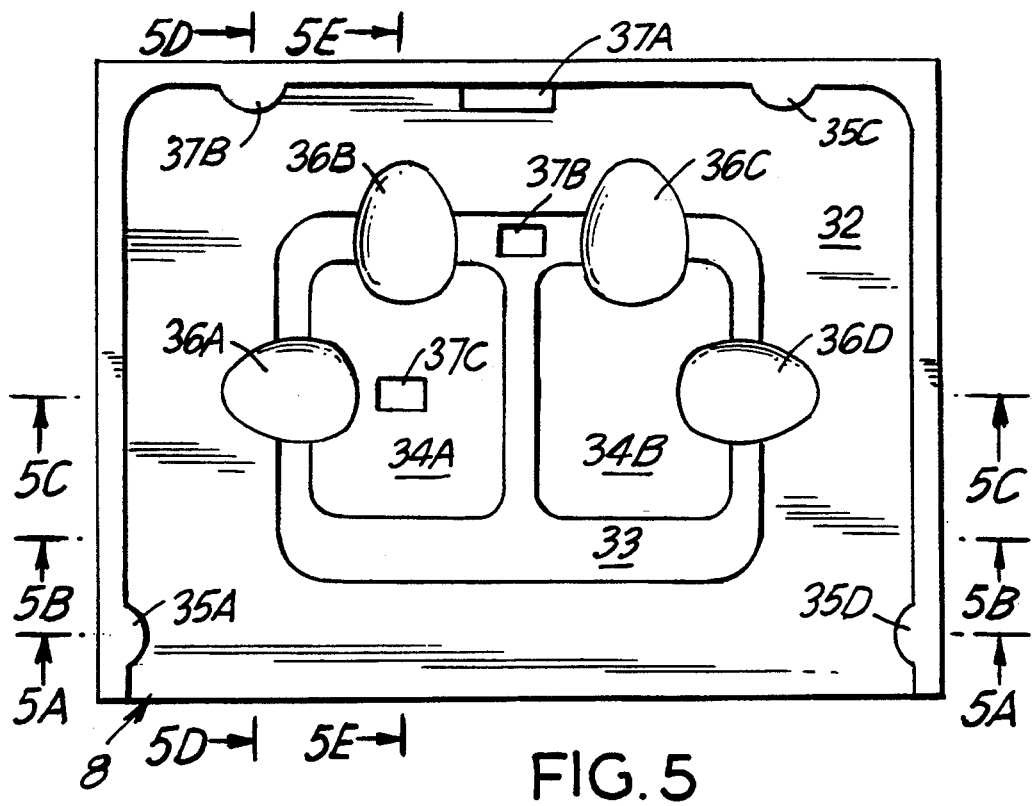
FIG. 5 is a plan view of the illustrative embodiment of the dental x-ray support tray of the present invention.
Figure 5E:
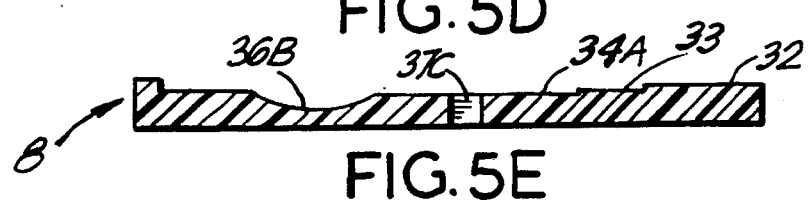
FIG. 5E is a fifth cross-sectional view of the dental x-ray support tray of the present invention, taken along line 5E—5E of FIG. 5.
Figure 6:
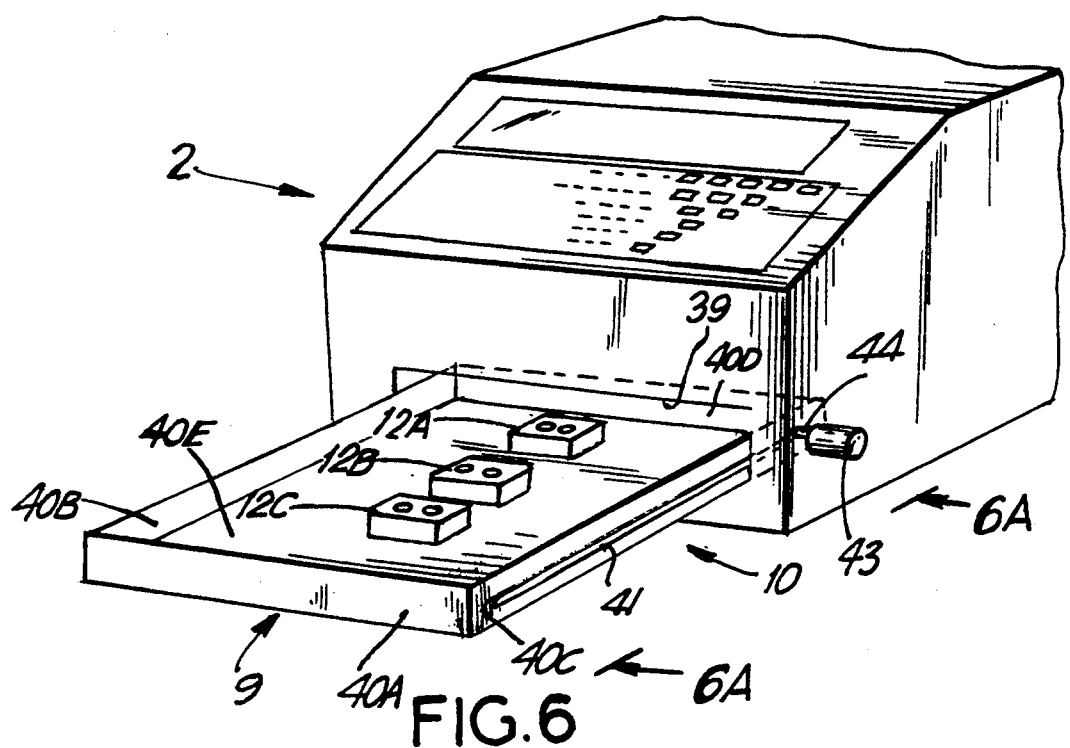
FIG. 6 is a perspective, partially fragmented view of the dental x-ray inscription system of the present invention, showing the inscription platform disposed in its protracted loading position and operably associated with the inscription platform transport mechanism, with the dental x-ray support tray removed from the inscription platform.
Figure 6A:
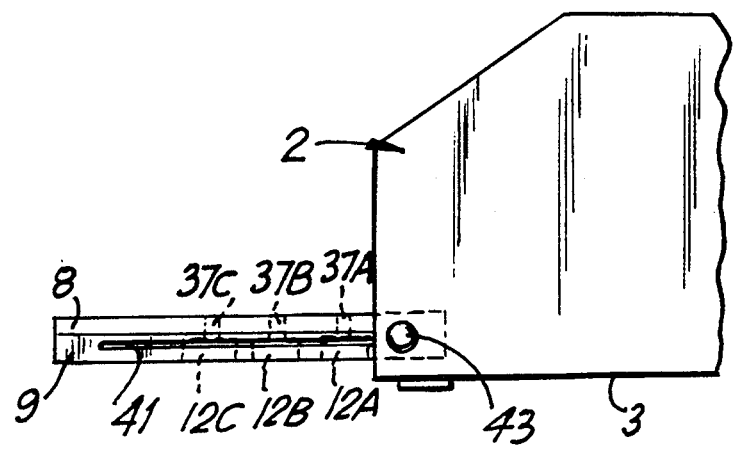
FIG. 6A is an elevated, partially fragmented side view of the dental x-ray inscription system of the present invention, taken along line 6A—6A of FIG. 6, illustrating the placement of each dental x-ray sensing cell within the inscription platform, relative to the sensing apertures formed in the dental x-ray support tray.

As shown in FIGS. 1A and 6A, inscription platform 9 carries dental x-ray support tray 8 during both the programming and inscription processes of the dental x-ray inscription system. As illustrated in FIGS. 5 through 5E, dental x-ray support tray 8 is particularly adapted to receive and support a panoramic size dental x-ray, a palate size dental x-ray, or two periapical size dental x-rays during the formation of physical inscriptions in the dental x-ray. In general, dental x-ray support tray 8 comprises a rectangular structure or substrate, having a width dimension of about 15 centimeters, a length dimension of about 9 centimeters, and an overall thickness dimension of about 1.5 centimeters. Preferably, the dental x-ray support tray is formed from a suitable plastic material so that it is substantially rigid. Such materials include, for example, lightweight metal such as aluminum or other suitable material.

As can be seen from FIGS. 5 through A, dental x-ray support tray 8 has three major levels of depth structure, namely: upper mounting recess 32 for receiving an end portion of a periapical size dental x-ray; an intermediate mounting recess 33 for receiving a palate size dental x-ray; and a pair of spaced apart lower mounting recesses 34A and 34B for receiving a pair of periapical size dental x-rays. Notably, the dimensions of each of these mounting recesses are only slightly greater than those dimensions of the developed dental x-ray (or portion thereof) to be received in the mounting recess. The depth of the intermediate mounting recess 33 and the lower mounting recesses 34A and 34B, as measured from the planar surface below which they extend, is approximately equal to the thickness of these particularly sized dental x-rays.

Figure 5A:
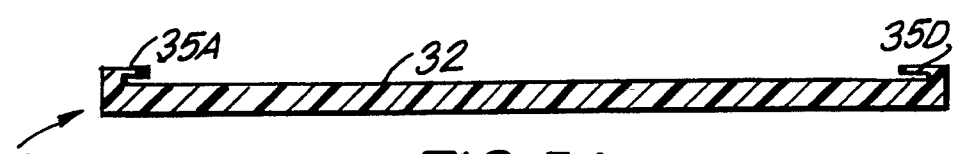
FIG. 5A is a first cross sectional view of the dental x-ray support tray of the present invention, taken along line 5A—5A of FIG. 5.
Figure 5B:
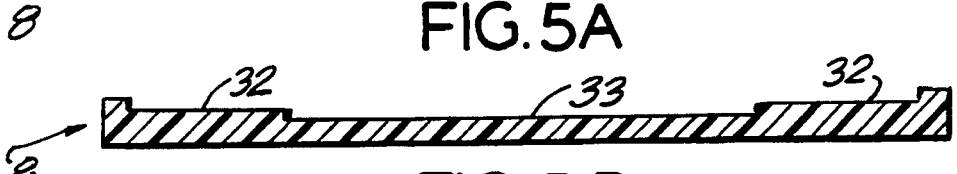
FIG. 5B is a second cross-sectional view of the dental x-ray support tray of the present invention, taken along line 5B—5B of FIG. 5.
Figure 5C:
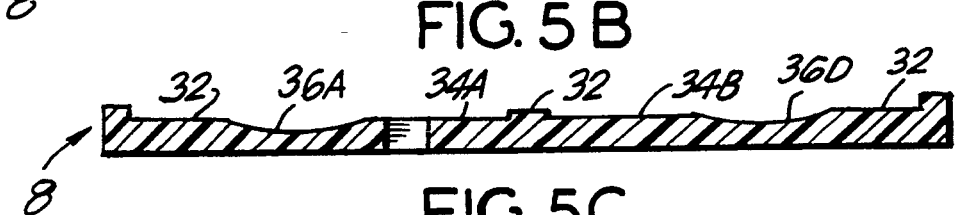
FIG. 5C is a third cross-sectional view of the dental x-ray support tray of the present invention taken along line 5C—5C of FIG. 5.
Figure 5D:
FIG. 5D is a fourth cross-sectional view of the dental x-ray support tray of the present invention, taken along line 5D—5D of FIG. 5.

As only an end portion of the panoramic size dental x-ray is adapted to be received and supported within support tray 8, four tabs 35A, 35B, 35C, and 35D extend from the perimetrical side edges of the upper mounting recess 33, illustrated in FIGS. 5, 5A and 5D. As shown in FIG. 7B, these tabs extend over and thus hold down a panoramic size dental x-ray while it is positioned within its mounting recess. In the illustrative embodiment, the depth of upper mounting recess 32 has been made substantially deeper than the thickness of a panoramic size dental x-ray in order to form these holding tabs.

In order to permit the user to easily remove an inscribed dental x-ray from either the intermediate or lower mounting recesses, spaced apart finger-tip accommodating recesses 36A, 36B, 36C and 36D are formed in the substrate, adjacent these mounting recesses. In this way, the user simply places his or her index finger within one of two finger-tip accommodating recesses provided for palate and periapical sized dental x-rays, then lifts up under the dental x-ray to pick it up between the user's index finger and thumb. As illustrated in FIG. 5C, 5D and 5E, each finger accommodating recess has a smooth depth characteristic to facilitate the removal of palate and periapical size dental x-rays from the dental x-ray support tray.

As will become apparent during the description of the programming cycle of the present invention, the system controller must ascertain that a developed dental x-ray placed within protracted support tray 8 by the user, does, in fact, have the particular x-ray size (e.g. panoramic, palate or periapical) indicated by the dental x-ray size data entered into the system by the user, via the keyboard panel. In order to confirm such conditions during the programming cycle, dental x-ray detection circuit 11 senses whether a panoramic, palate or periapical size dental x-ray has been placed within its designated mounting recess in the dental x-ray support tray. As will be described in greater detail hereinafter, this function is achieved in the illustrative embodiment by transmitting and receiving pulsed infrared light through sensing apertures 37A, 37B and 37C, which are formed through the support tray substrate in each of the three different type mounting recesses, as shown in FIGS. 5, 5C, 5D and 6A. When a particular size dental x-ray is placed in its designated mounting recess, the transmitted infrared signal will be reflected off the underside of the dental x-ray, and pass through the sensing aperture, below which it is detected and processed to automatically produce a dental x-ray detection signal indicative of the presence of the detected dental x-ray. As will be described in greater detail hereinafter, these light transmission/reception functions are carried out at each mounting recess by a dental x-ray sensing cell mounted upon inscription platform 9, as shown in FIG. 6, so that these sensing cells 12A, 13B and 12C are spatially aligned with sensing apertures 37A, 37B, and 37C when the dental x-ray support tray is snap-fitted onto the inscription platform, as shown in FIGS. 5 and 6A.

As illustrated in FIGS. 1 and 6, inscription platform 9 is formed as a horizontally transportable drawer which can be protracted outwardly through rectangular aperture 39 in the housing as shown in FIG. 1A, or retracted within the housing as shown in FIG. 1. As illustrated, inscription platform 9 comprises side walls 40A, 40B, 40C, and 40D, bottom wall 40E, and interior channels 41, which permit the dental x-ray support tray to releasably snap into and out of the inscription platform, as required. While not shown, the housing includes guide tracks within which the inscription platform is supported in a manner to permit horizontal translational movement, as described above. Horizontal translation of the inscription platform, and thus the dental x-ray support tray, is achieved by inscription platform transport mechanism 10, which is preferably realized by an electric motor 43 and gear reduction unit 44. In order to horizontally translate the inscription platform within the guide tracks, driver/interface circuitry 10A provides electric drive signals to electric motor 43, at times and for a duration predetermined by a Motor Control Routine within the System Control Program carried out by the system controller.

Figure 6B:
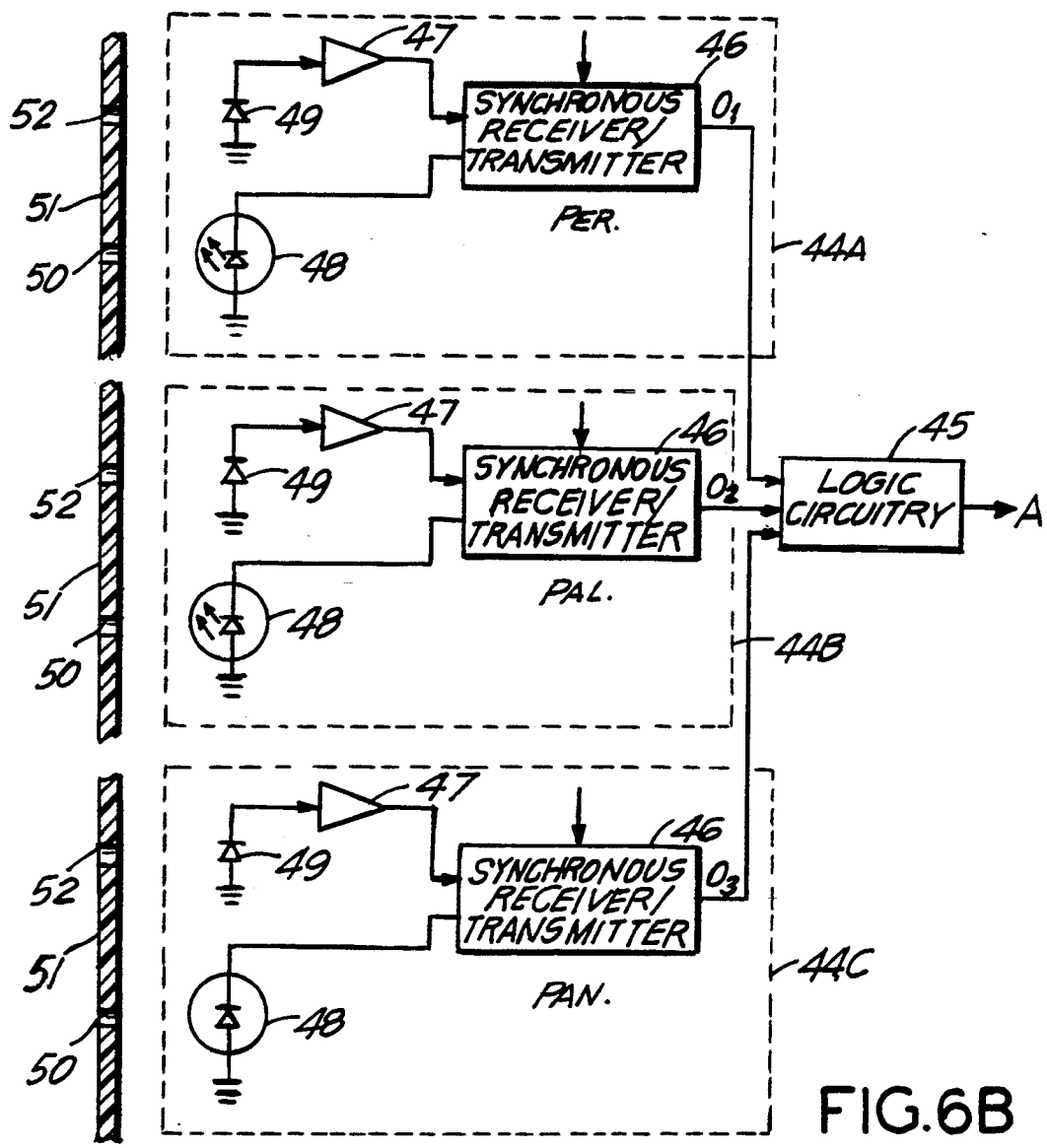
FIG. 6B is a schematic diagram of the dental x-ray detection circuit of the dental x-ray inscription system of the present invention.
Figure 6C:
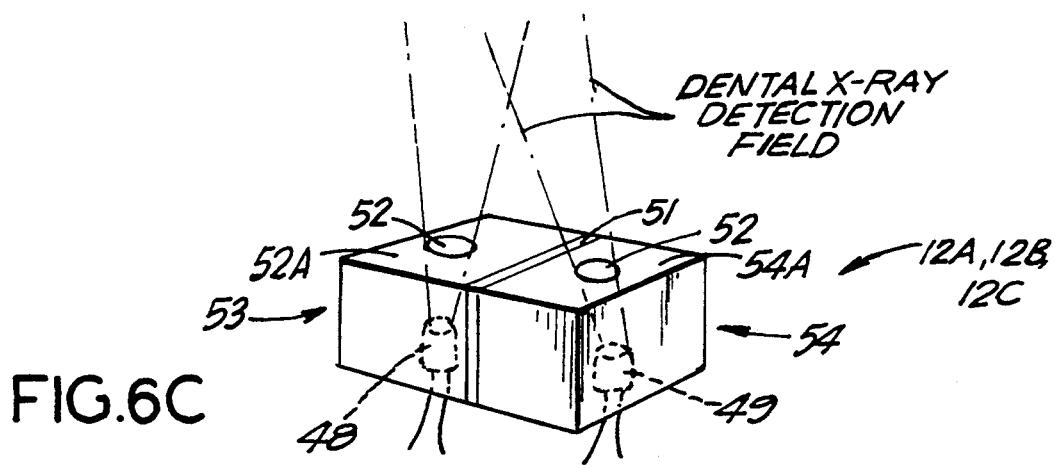
FIG. 6C is a perspective view of one dental x-ray sensing cell utilized in the dental x-ray detection circuit of the dental inscription system of the present invention.

Referring now to FIG. 6B, dental x-ray detection circuit 11 comprises three infrared (IR) light sensing circuits 44A, 44C and 44C, each operably connected at its output, to logic circuitry 45 from which dental x-ray detection signal $A_1$, is produced. As illustrated, each IR light sensing circuit comprises a synchronous receiver/transmitter 46, a current-to-voltage amplifier 47, and a dental x-ray sensing cell 12A, 12B and 12C, as shown in FIG. 6C. Each dental x-ray sensing cell includes an infrared LED 48 that generates a 940 nanometer pulsed IR light signal at a rate of about 10.0 KHz, and a photodiode 49 for detecting the pulsed IR light signal when reflected off a developed dental x-ray. This pulsed IR signal is transmitted through transmission aperture 50 formed in wall 51 of each sensing cell, to illuminate a dental x-ray detection field, which a dental x-ray in its mounting recess transects. When a dental x-ray is present in its designated mounting recess, a reflected IR pulse signal is produced from its surface and focused through receiving aperture 52 onto photodiode 49. Notably, the placement of photodiode 49 from receiving aperture 52 and the dimensions of the receiving aperture itself will directly determine the geometrical characteristics of each dental x-ray detection field. The output of photodiode 49 is converted to a voltage by current-to-voltage amplifier 47, and the output thereof is provided as input to synchronous receiver/transmitter 46 which synchronously compares the received IR pulse signal with the transmitted signal and determines whether a developed dental x-ray is present in its support tray mounting recess. If so, then the synchronomous receiver/transmitter produces a logic "1" as output, indicative that such a condition exists, otherwise, the synchronous receiver/transmitter produces as output a logic "0".

The overlapping nature of the mounting recesses in the dental x-ray support tray, cause multiple detections with panoramic and palate size dental x-rays. In particular, when a panoramic size dental x-ray is placed within the dental x-ray support tray, IR sensing circuits 44A, 44B and 44C each produce a logical "1" as output. When a palate size dental x-ray is placed within the dental x-ray support tray, IR sensing circuits 44B and 44c each produce a logical "1" as output. On the other hand, when a periapical size dental x-ray is placed in the left lower mounting recess (i.e. when desiring to inscribe one or a pair of periapical size dental x-rays), only IR sensing circuit 44C produces a logic "1" as output. In order to produce dental x-ray detection signal $A_1$ from outputs $0_1$, $0_2$ and $0_3$, logic circuitry 45 is provided. Assuming the system bus provides an 8 bit control bus, the function of logic circuitry 45 is to produce as output: $A_1 = 00000001$ for periapical dental x-rays when $0_1 = 1$, $0_2 = 0$, $0_1 = 0$; $A_1 = 00000010$ for palate dental x-rays when $0_1 = 1$, $0_2 = 1$, $0_3 = 0$; $A_1 = 00000011$ for panoramic dental x-rays when $0_1 = 1$, $0_2 = 1$ and $0_3 = 1$; and $A_1 = 00000000$ for all other values of $0_1$, $0_2$ and $0_3$.

Referring to FIG. 6C, the particular construction of each dental x-ray sensing cell is illustrated. As shown, each IR LED 48 is mounted and substantially enclosed within an optically opaque cell 53 defined by six walls with transmission aperture 52 formed through wall 52A. Similarly, each photodiode 49 is mounted and substantially enclosed within an optically opaque cell 54 defined by six walls with receiving aperture 52 formed through wall 54A. With the IR LEDs and photodiodes being optically isolated from each other, and the reception sensitivity of each synchronous transmitter/receiver 46 set to a sufficiently low level, automated detection of different sized dental x-rays in their respective support tray mounting recesses can be achieved, while preventing false detections.

In most instances, a substantial portion of the x-ray image in a developed dental x-ray will reside substantially within the central portion of the dental x-ray, with minimal structural detail present in the perimetrical border regions thereof. Consequently, in such instances, any one of the perimetrical border regions may be selected as an inscription field within which physical inscriptions corresponding to patient identifying indicia can be laser inscribed. However, in some instances, significant structural detail will reside not only in the central portion of the developed dental x-ray, but also within one or more of the perimetrical border regions. In such instances, it will not be desired to laser inscribe therein patient identifying indicia. To fully exploit the user's visual judgment in such instances, the programmable dental x-ray inscription system of the present invention permits the user to select which perimetrical border region(s) of the developed dental x-ray should be physically inscribed with patient identifying indicia. As will be described in greater detail hereinafter, selection of a desired inscription field occurs during the programming cycle of system, while the developed dental x-ray is mounted within the dental x-ray support tray.

In order to carry out the laser inscription process in general and the inscription field selection subprocess in particular, it is essential to model, relative to a coordinate system, the position, spatial extent and orientation of each inscription field that may be selected by the user. Only thereafter can the coordinates of selected patient identifying indicia be specified with respect to this coordinate system. As inscription fields for each of the three different sized dental x-rays are each positioned and oriented differently in three dimensional space, it will be advantageous to define each of the inscription fields for panoramic, palate and periapical size dental x-rays with respect to a different three-dimensional (3D) Cartesian coordinate system. As will be described in greater detail hereinafter with respect to FIGS. 7 through 9A, each Cartesian coordinate system is embedded at a different part of the dental x-ray support tray, that is, when the support tray is fully retracted within the housing beneath laser beam focusing optics 19 and laser scanning mechanism 17.

As illustrated in FIGS. 7 through 7B, inscription fields IF1, IF2 and IF3 for panoramic size dental x-rays are defined with respect to 3D Cartesian coordinate system $R_{pan}$, embedded at the center of the dental x-ray support tray. In general, Cartesian coordinate system $R_{pan}$ is characterized by x, y, and z coordinate axes, where the x and y coordinate axes extend substantially within the plane of upper mounting recess 32, while the z coordinate axis extends normal thereto. As shown, the x and y coordinate axes are also oriented so as to extend parallel to the rear and side edges of the upper mounting recess, as shown. Preferably at the place of manufacture, the set of x, y and z coordinates delineating the spatial extent of each inscription field for panoramic size dental x-rays, is specified (i.e. determined) and then permanently stored in non-volatile program memory 21.

The System Control Program includes a Panoramic Coordinate Computing Routine for computing the set of coordinates which specify the locus of points $\{P_i(x,y,z)\}$ corresponding to the geometry of patient identifying indicia (e.g. alphanumeric characters, barcode symbols, etc.) selected for inscription in the developed dental x-ray. As will be described hereinafter, the Panoramic Coordinate Computing Routine is carried out by the system controller at a designated stage of the System Control Program. In general, the Panoramic Coordinate Computing Routine utilizes (i) data corresponding to the preselected patient identifying indicia, (ii) the set of x,y,z coordinates delineating the spatial extent of the user selected inscription field for panoramic dental x-rays, and (iii) data for scaling the coordinate data corresponding to the preselected patient identifying indicia. Preferably, the data corresponding to the preselected patent identifying indicia (e.g. a string of alphanumeric characters) comprises x,y,z coordinate data, wherein each alphanumeric character is specified with respect to a 3-D Cartesian coordinate system $R_{FL}$ associated with the Character Font Library of the system. Using this information, the Panoramic Coordinate Computing Routine computes the x,y,z coordinates of the locus of points $\{P_{di}(x,y,z)\}$. In general, this computational step involves transforming the coordinates of each alphanumeric character from Coordinate System $R_{FL}$ to the inscription field within coordinate system $R_{pan}$. Notably, the locus of points $\{P_{di}(x,y,z)\}$ specifies the path on the upper surface of the dental x-ray, which the laser beam must scan in order to form in the selected inscription field, physical inscriptions corresponding to the preselected patient identifying indicia entered into the programmable dental x-ray inscription system via the keyboard panel. Once computed, the set of x,y,z coordinates for the locus of points $\{P_{di}(x,y,z)\}$ is organized into a data file which is stored in data storage memory 6.

To actually scan the laser beam along the locus of points $\{P_{di}(x,y,z)\}$ within the selected inscription field of the dental x-ray, it is necessary to generate scanner control signals $X_i(t)$ and $Y_i(t)$ and laser control signal $Z_i(t)$ which, when converted into drive signals $x_i(t)$, $y_i(t)$ and $z_i(t)$, respectively, drives galvanometric motors 29A and 29B and laser beam producing source 13 in the laser beam scanning mechanism. In order to clearly illustrate how this step is achieved, it will be helpful to describe the underlying mathematical model employed in controlling the operation of the laser beam scanning mechanism.

As illustrated in FIG. 7, the physical inscription of a developed dental x-ray 56 along the locus of points $\{P_{di}(x,y,z)\}$ where z is selected to be some essentially constant inscription depth, is achieved by reflecting the laser beam off stationary mirror 28, then off the x and y axis scanning mirrors 29 and 30, and then through laser beam focusing optics 19, all of which are arranged within the housing. As shown, the shaft of galvanometric motor 29A is oriented along the y axis to deflect the laser beam along the x axis, while the shaft of the galvanometric motor 30A is oriented along the x axis to deflect the laser beam along the y axis. Mounted to the ends of these motor shafts are the x and y axis scanning mirrors 29 and 30, respectively, for joint rotation movement therewith. Angular deflection of these scanning mirrors is achieved by driver/interface circuitry 17A, which converts the computed set of coordinates into scanner control signals $X_i(t)$ and $Y_i(t)$. In response, these scanner control signals rotate the shafts of galvanometric motors 29A and 30A, and cause scanning mirrors 29 and 30 to scan the focused laser beam along the computed locus of points $\{P_{di}(x,y_i,z)\}$ where each such point has the coordinate values x,y,z lying within the user selected inscription field.

In general, the laser scanning mechanism utilizes ray tracing model in order to represent the path that the projected laser beam transverses during its interaction with the various optical components of the laser beam scanning mechanism. As shown in FIGS. 7, 8, and 9, the laser beam focusing mechanism is represented as a single optical element 19. In accordance with this modelling approach, the x,y,z coordinates of the locus of points $\{P_{di}(x,y,z)\}$ are mapped onto the upper surface of optical element 19 using (i) the point spread function of the laser beam focusing system and (ii) the x,y,z, coordinate values of the locus of points $\{P_{di}(x,y,z)\}$. In this way, a simpler ray tracing model can be constructed for purposes of describing the laser beam path in three dimensional space, namely: from the output of stationary laser 13 and collimating lens 27 to point $P_{si}$ on stationary mirror 28; from point $P_{si}(x,y,z)$ to point $P_{si}$ on the x-axis scanning mirror 29; from point $P_{xi}$ on the x-axis scanning mirror to point $P_{yi}$ on the y-axis scanning mirror 30; and from point $P_{yi}$ to point $P'_{di}$ on optical element 19, corresponding to the mapped point $P_{di}(x,y,z)$, via representational path $r_{ei}$, lying along the computed locus of points $\{P_{di}(x,y,z)\}$ within the user-selected inscription field.

As illustrated in FIG. 7, the path traversed by the laser beam between these optical elements and point $P'_{di}$ on optical element 19, comprises four principal laser beam path segments, namely: laser beam path $r_{ai}$ extending from the stationary laser/collimating lens 27 to point $P_{si}$ on stationary mirror 28; laser beam path $r_{Bi}$ extending from point $P_{si}$ on the stationary mirror to point $P_{xi}$ on the x-axis scanning mirror; laser beam path $r_{Ci}$ extending from point $P_{xi}$ on the x-axis scanning mirror to point $P_{yi}$ on the y-axis scanning mirror and laser beam path $r_{Di}$ extending from point $P_{yi}$ on the y-axis scanning mirror to point $P'_{di}$ on optical element 19, and laser beam path $r_{ei}$ extending from point $P'_{di}$ on optical element 19 to point. $P'_{di}(x,y,z)$ on the developed dental x-ray.

In order to develop the mathematical model of the laser scanning mechanism, a number of optical elements in the system must also be specified with respect to Cartesian coordinate system $R_{pan}$. Specifically, the surface of stationary mirror 28 is represented by three dimensional surface equation $S_{si}(x,y,z)$; the surface of the x-axis scanning mirror is represented by a three dimensional surface equation $S_{xi}(x,y,z)$; and the surface of the y-axis scanning mirror is represented by a three dimensional surface equation $S_{yi}(x,y,z)$. In addition, laser beam paths $r_{Ai}$, $r_{Bi}$, $r_{Ci}$ and $r_{Di}$ are each represented by three dimensional line equations, namely: $r_{Ai}(x,y,z)$, $r_{Bi}(x,y,z)$, $r_{Ci}(x,y,z)$, and $r_{Di}(x,y,z)$, respectively. Finally, at each of the mirror reflection points $P_{si}$, $P_{xi}$, and $P_{yi}$, normal vectors $N_1$, $N_2$ and $N_3$, angles of incidence $\alpha_1$, $\alpha_2$, $\alpha_3$ and angles of reflection $\beta_1$, $\beta_2$, $\beta_3$ are defined. According to the laws of physical optics, a valuable relationship holds among these angles, namely: the angle of incidence at each point equals the angle of reflection at that point. Thus, the following relations are obtained: $\alpha_1 = \beta_1$, $\alpha_2 = \beta_2$ and $\alpha_3 = \beta_3$.

In the above described model of the laser scanning mechanism, each computed point $P'_{di}$ has associated with it, a unique surface equation $S_{xi}(x,y,z)$ for the y-axis scanning mirror and the unique surface equation $S_{yi}(x,y,z)$ for the y-axis scanning mirror. Accordingly, the problem presented is to solve, at each computed point $P'_{di}$, the associated set of coefficients for surface equations $S_{xi}(x,y,z)$ and $S_{yi}(x,y,z)$ with respect to coordinate system $R_{pan}$. Once the coefficients of these surface equations are known, surface equation $S_{xi}(x,y,z)$ can be transformed to local coordinate system $R_{mx}$ embedded within galvanometric motor 29A, and surface equation $S_{yi}(x,y,z)$ transformed to local coordinate system $R_{my}$ embedded within galvanometric motor 30A. Such coordinate transformations can be achieved using homogenous transformations well known in the art. From these transformed surface equations, the angles of rotation $\Phi_{xi}$ and $\Phi_{yi}$ defined about motor shafts 29B and 30B, respectively, can be computed to ascertain the precise amount that the x and y axis scanning mirrors must be rotated, with respect to their local coordinate systems, in order to direct the laser beam to mapped point $P'_{di}$ and, in effect, scan point $P_{di}$ along the computed locus of points $\{P_{di}(x,y,z)\}$. From these computed shaft rotation angles $\Phi_{xi}$ and $\Phi_{yi}$, scanner control signals $X_i(t)$ and $Y_i(t)$ and laser control signal $Z_i(t)$ are computed and then stored in data storage memory for use by driver interface circuitry 15 and 17A, respectively, during the laser inscription process.

Controlling the desired orientation of the x and y axis scanning mirrors with respect to local coordinate systems $R_{mi}$ and $R_m$ is simply achieved by driving galvanometric motors 29A and 30A with drive signals $x_i(t)$ and $y_i(t)$, respectively, which comprise trains of electrical current pulses that cause the x and y axes scanning mirrors to undergo angular displacement to computed rotation angles $\Phi_{xi}$ and $\Phi_{yi}$, respectively. Control of the laser inscription depth at each point $P_{di}(x,y,z)$ is achieved by laser drive signal $z_i(t)$. As discussed hereinabove, drive signals $x_i(t)$ and $y_i(t)$ are generated from scanner control signals $X_i(t)$ and $Y_i(t)$, respectively, using driver/interface circuitry 17A, whereas laser drive signal $z_i(t)$ is generated from laser control signal $Z_i(t)$ using driver/interface circuitry 15.

Figure 7A:
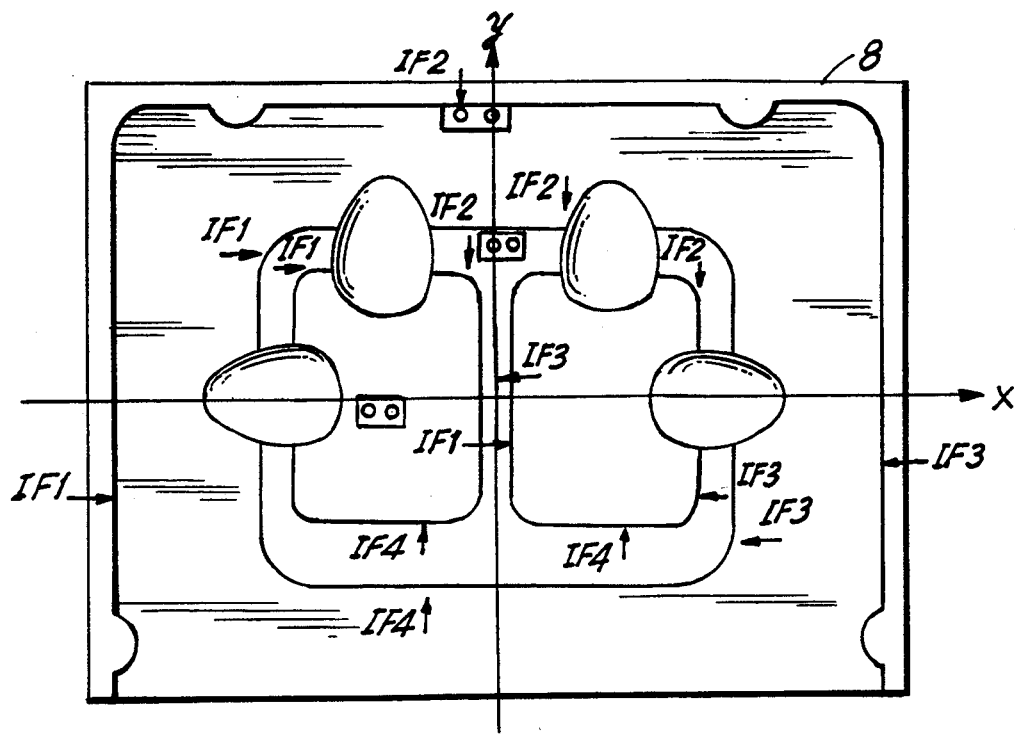
FIG. 7A is a plan view of the dental x-ray support tray and the embedded Cartesian coordinate system of FIG. 7, without a panoramic size dental x-ray supported therein.
Figure 7B:
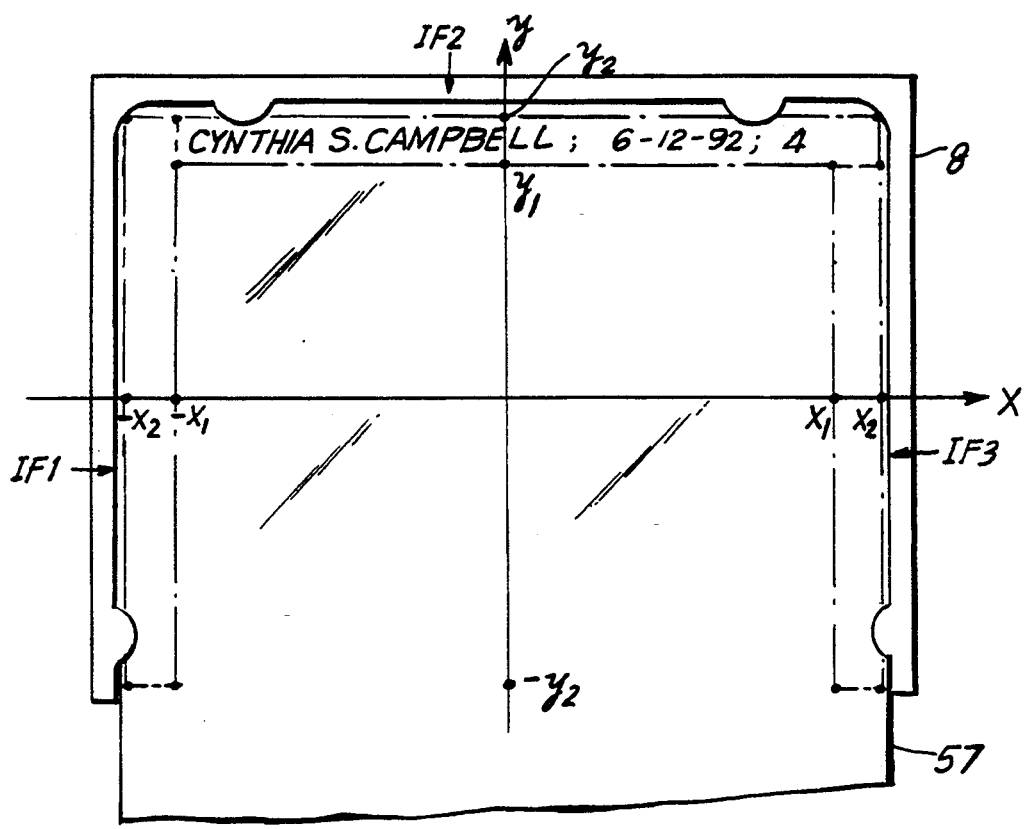
FIG. 7B is a plan view of the dental x-ray support tray and the embedded Cartesian coordinate system of FIG. 4, with a panoramic size dental x-ray supported therein.
Figure 8A:
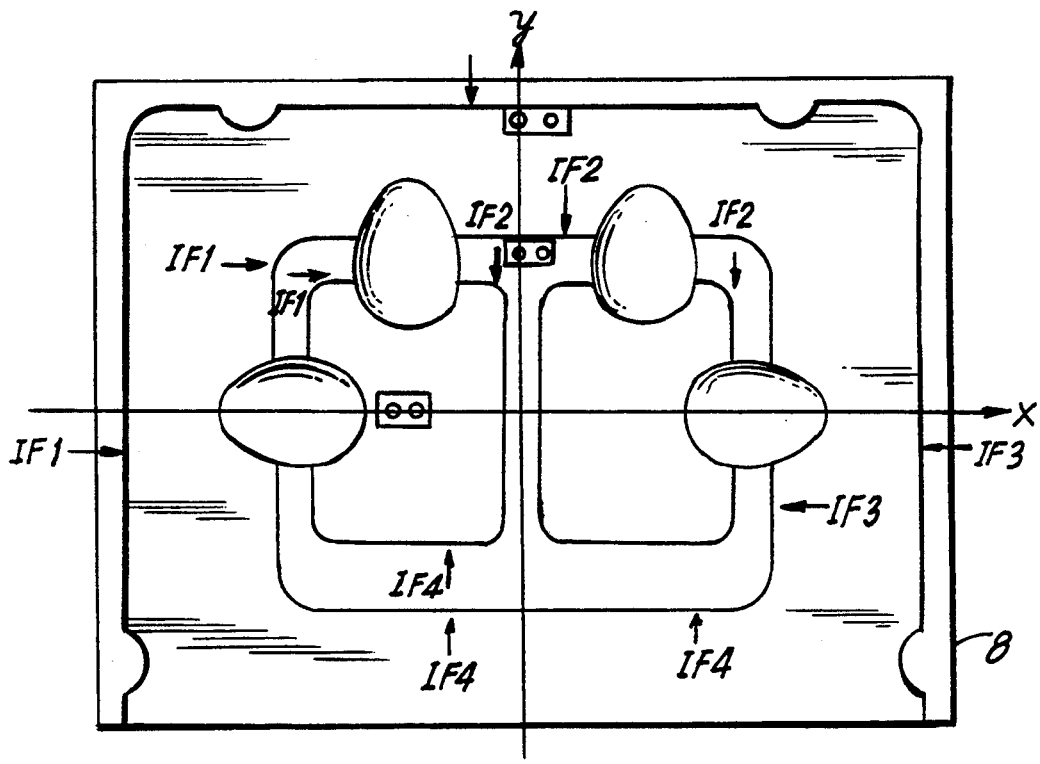
FIG. 8A is a plan view of the dental x-ray support tray and the embedded Cartesian coordinate system of FIG. 8, without a palate size dental x-ray supported therein.
Figure 8B:
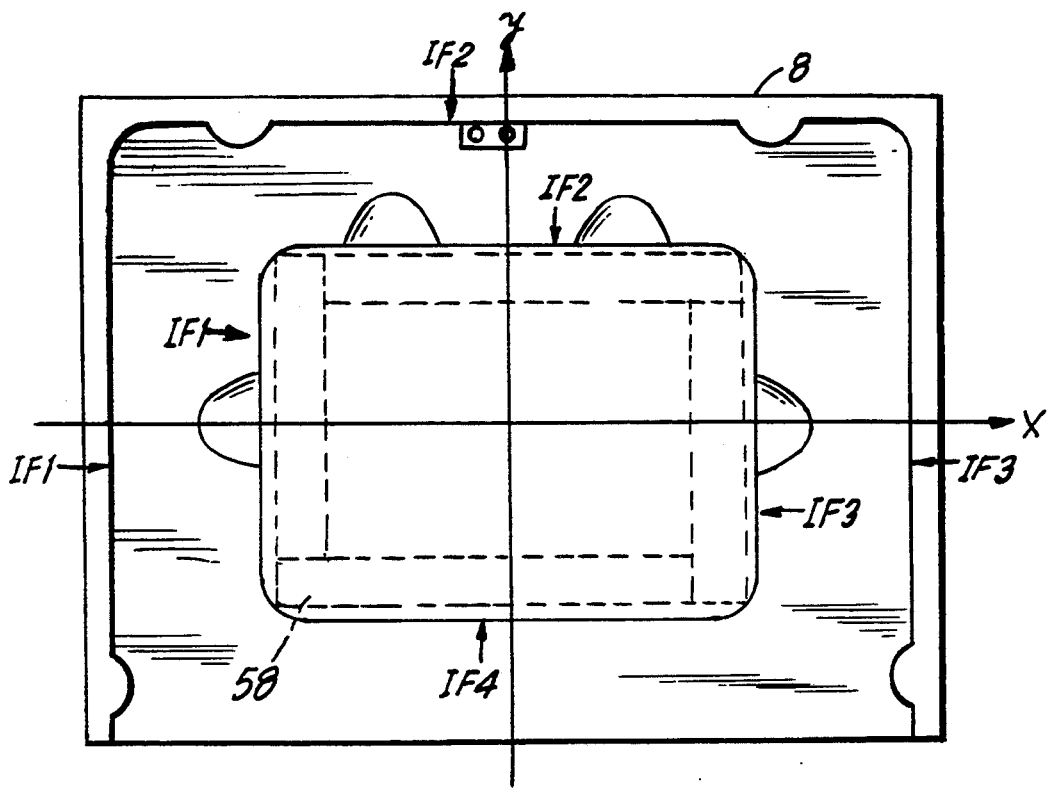
FIG. 8B is a plan view of the dental x-ray support tray and the embedded Cartesian coordinate system of FIG. 8, with a palate size dental x-ray supported therein.
Figure 9B:
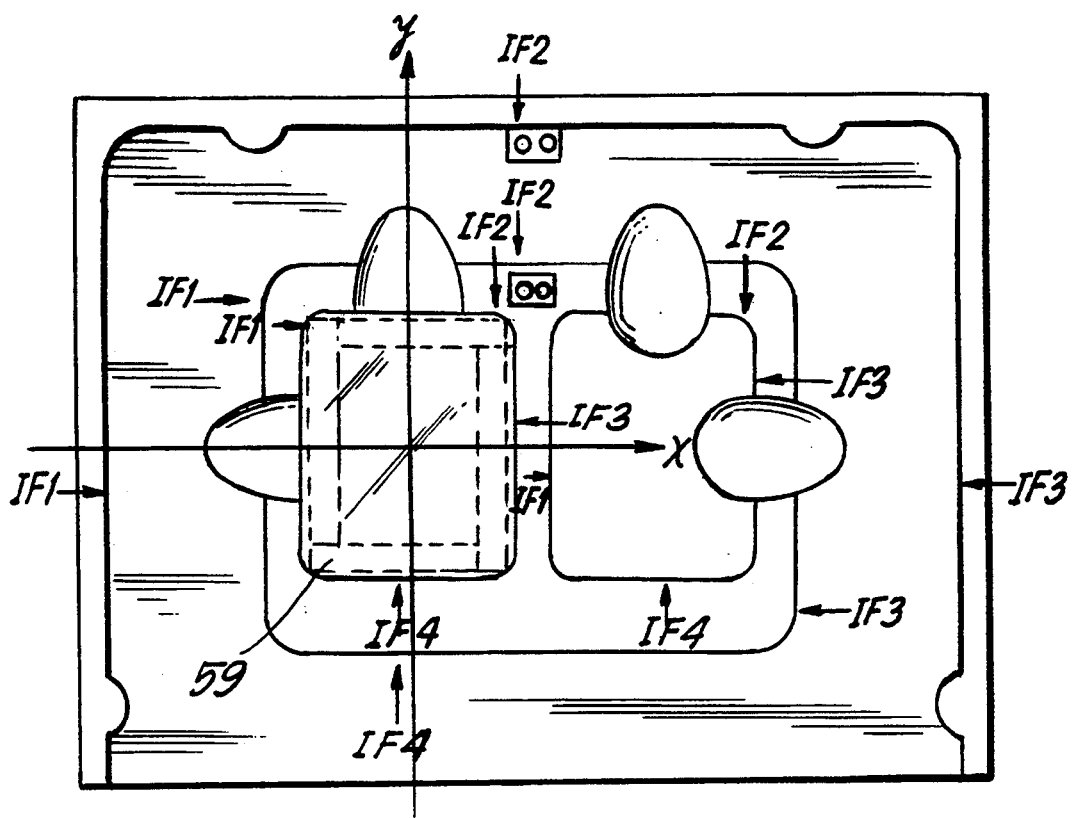
FIG. 9B is a plan view of the dental x-ray support tray and the embedded Cartesian coordinate system of FIG. 9 with a periapical size dental x-ray supported therein.

In order to aid the user in selecting an inscription field which is best suited for a particular dental x-ray, a set of graphical inscription field indicators (e.g. "IF1", "IF2", "IF3" and "IF4") are provided to the top surface of the support tray substrate, as illustrated in FIGS. 7A, 8A and 8B. Thus, when a panoramic size dental x-ray 57 is mounted within its recess in the support tray as shown in FIG. 7B, the inscription field indicators clearly indicate the inscription field designation automatically assigned to each of the three available perimetrical border regions within the developed dental x-ray. Similarly, when a palate or periapical size dental x-ray is mounted within its recess in the support tray as shown in FIGS. 8B and 9B, the inscription field indicators clearly indicate the inscription field designation automatically assigned to each of the four available perimetrical border regions within the developed dental x-ray. As will become more apparent hereinafter, these inscription field indicators facilitate the selection of the inscription field(s) by the user when programming the dental x-ray inscription system of the present invention.

In FIGS. 8 through 8B, inscription fields IF1, IF2, IF3 and IF4 for palate size dental x-rays are defined with respect to a 3D Cartesian coordinate system $R_{pal}$ embedded at the center of the dental x-ray support tray. As illustrated, the x and y coordinate axes of coordinate system $R_{pal}$ extend substantially within the plane of intermediate mounting recess 33, with the z-axis extending normal thereto. As in the case of panoramic size dental x-rays, the x and y coordinate axes preferably extend parallel to the rear and side edges of the intermediate mounting recess. Preferably, at the place of manufacture, the x,y,z coordinates delineating the spatial extent of each inscription field, IF1 through IF4 for palate size dental x-rays, are specified and thereafter permanently stored in non-volatile program memory 21.

In order to compute the set of coordinates specifying the locus of points $P_{di}(x,y,z)$ corresponding to the geometry of patient identifying indicia to be inscribed in the palate size dental x-ray 58, a Palate Coordinate Computing Routine is carried out by the system controller at a designated stage in the System Control Program. Similar to the Panoramic Coordinate Computing Routine, the Palate Coordinate Computing Routine also utilizes (i) coordinate data corresponding to the preselected patient identifying indicia, (ii) the set of x,y,z coordinates delineating the spatial extent of the user selected inscription field for palate dental x-rays, and (iii) data for scaling the coordinate data corresponding to the preselected patient identifying indicia. Using this information, the Palate Coordinate Computing Routine computes the x, y and z coordinates of the locus of points $\{P_{di}(x,y,z)\}$. Notably, locus of points specifies the path on the palate size dental x-ray, which the laser beam must scan in order to form physical inscriptions in the selected inscription field. Once computed, the set of x,y,z coordinates for the locus of points $\{P_i(x,y,z)\}$ is organized into a data file which is then stored in data storage memory 6.

In a manner similar to that described for panoramic size dental x-rays, a ray tracing model is constructed by mapping the computed set of x,y,z coordinates for the locus of points $\{P_{di}(x,y,z)\}$, into a set of x,y,z coordinates for the locus of points $\{P'_{di}(x,y,z)\}$ located on the upper surface of optical element 19 shown in FIG. 8. Thereafter, for each laser beam path terminated at point $P'_{di}$, the surface equations $S_{xi}(x,y,z)$ and $S_{yi}(x,y,z)$ for the x and y axis scanning mirrors are determined. Then using homogenous transformations, these surface equations are transformed from coordinate system $R_{pal}$ to local coordinate systems $R_{m1}$ and $R_{m2}$, respectively. From these transformed surface equations, motor shaft rotation angles $\Phi_{xi}$ and $\Phi_{yi}$ are computed for each point $P'_{di}$, and from these rotational angles, scanner control signals $X_i(t)$ and $Y_i(t)$ are generated and stored in data storage memory for use by driver/interface circuitry 17A in order to generate scanning drive signals $x_i(t)$ and $y_i(t)$, during the laser inscription process. Also, for each point $P'_{di}$, a laser control signal $Z_i(t)$ is generated and stored in data storage memory 6, and from laser control signal $Z_i(t)$, a laser drive signal $z_i(t)$ is generated by driver/interface circuitry 15.

In FIGS. 9 through 9B, inscription fields $IF_1$, $IF_2$, $IF_3$ and $IF_4$ for periapical size dental x-rays are defined with respect to a 3D Cartesian coordinate system $R_{Lper}$ embedded at the center of the dental x-ray support tray, as shown. As illustrated, the x and y coordinate axes of coordinate system $R_{Lper}$ extends substantially within the plane of intermediate mounting recess 33, with the y-axis extending normal thereto. As in the case of panoramic and palate size dental x-rays, the x and y coordinate axes preferably extend parallel to the rear and side edges of the left lower mounting recess. Preferably, at the place of manufacture, the x,y,z coordinates delineating the spatial extent of each inscription field, IF1 through IF4 for periapical size dental x-rays, are also specified (i.e. determined) and thereafter permanently stored in non-volatile program memory 21.

In order to compute the set of coordinates which specify the locus of points $\{P_{di}(x,y,z)\}$ corresponding to the geometry of patient identifying indicia to be physically inscribed in the periapical size dental x-ray, a Left Periapical Coordinate Computing Routine is carried out by the system controller at a designated stage in the control system program. Similar to the Panoramic and Palate Coordinate Computing Routines, the Left Periapical Coordinate Computing Routine utilizes (i) coordinate data corresponding to the preselected patient identifying indicia, (ii) the set of x,y,z coordinates delineating the spatial extent of the user selected inscription field for left periapical dental x-ray, and (iii) data for scaling the coordinate data corresponding to the preselected patient identifying indicia. Using this information, the Left Periapical Coordinate Computing Routine computes the x,y,z coordinates of the locus of points $\{P_{di}(x,y,z)\}$. Notably, this locus of points specifies the path on the periapical size dental x-ray 59, which the laser beam must scan in order to form physical inscriptions in the selected inscription field. Once computed, the set of x, y and z coordinates for the locus of points $\{P_{di}(x,y,z)\}$ is organized into a data file which is then stored in data storage memory 6.

In a manner similar to that described for panoramic and palate size dental x-rays, a ray tracing model is constructed by mapping the computed set of x,y,z coordinates for the locus of points $\{P_{di}(x,y,z)\}$, into a set of x,y,z coordinates for points $\{P'_{di}(x,y,z)\}$ on the upper surface of optical element 19 shown in FIG. 9. Thereafter, for each laser beam path terminated at point $P'_{di}$, the surface equations $S_{xi}(x,y,z)$ and $S_{yi}(x,y,z)$ for the x and y axis scanning mirrors are determined. Then using homogenous transformations, these surface equations are transformed from coordinate system $R_{Lper}$ to local coordinate systems $R_{m1}$ and $R_{m2}$, respectively. From these transformed surface equations, motor shaft rotation angles $\Phi_{xi}$ and $\Phi_{xi}$ are computed for each point $P'_{di}(x,y,z)$, and from these shaft rotation angles, scanner control signals $X_i(t)$ and $Y_i(t)$ are generated and stored in data memory 6 for use by driver/interface circuitry 17A in order to generate laser drive signals $x_i(t)$ and $y_i(t)$ during the laser inscription process. Also, for each point $P'_{di}$, a laser control signal $z_i(t)$ is generated and stored in data storage memory 6, and from laser control signal $Z_i(t)$ a laser drive signal $z_i(t)$ is generated by drive/interface circuitry 15 in order to drive laser 13 and to produce a laser beam having a predetermined power density at the surface of the developed dental x-ray.

While not illustrated, the sets of coordinates delineating the spatial extent of inscription fields IF1 through IF4 for a periapical size dental x-ray in the right mounting recess of the support tray, are specified with respect to a 3D Cartesian coordinate system $R_{Rper}$. Thereafter, these sets of coordinates are stored in nonvolatile program memory 21. The set of x,y,z coordinates for the locus of points {P$_{di}$(x,y,z)} corresponding to selected patient identifying indicia are then computed in a manner described above, organized into a data file and stored in data storage memory 6. Using this coordinate data and the techniques described above, the shaft rotation angles $\Phi_{xi}$ and $\Phi_{yi}$ are computed, and from these shaft rotation angles, scanner control signals X$_i$(t) and Y$_i$(t) are derived for each point along the locus of points to be scanned within the user selected inscription field. These scanner control signals X$_i$(t) and Y$_i$(t) are stored in data storage memory 6 for use during the laser inscription process. In addition, laser control signal Z$_i$(t) is also generated and stored for subsequent use during the laser inscription process.

Figure 10:
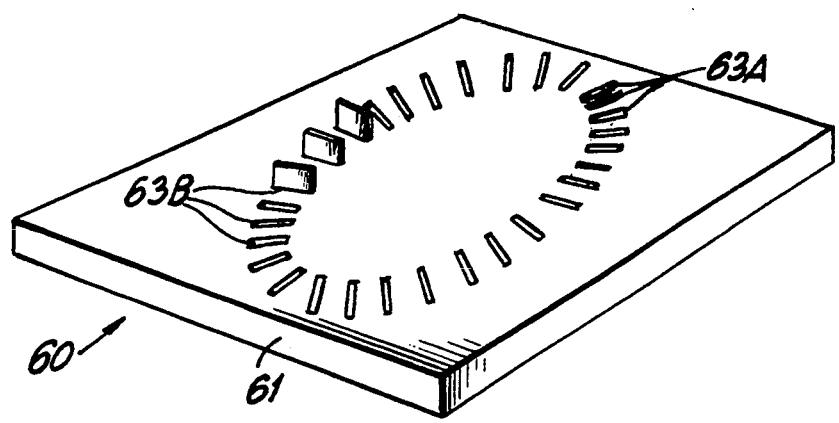
FIG. 10 is a perspective view of the portable dental x-ray holding/organizing tray of the present invention which, in FIG. 1, is shown mounted atop the dental x-ray inscription system.
Figure 10A:
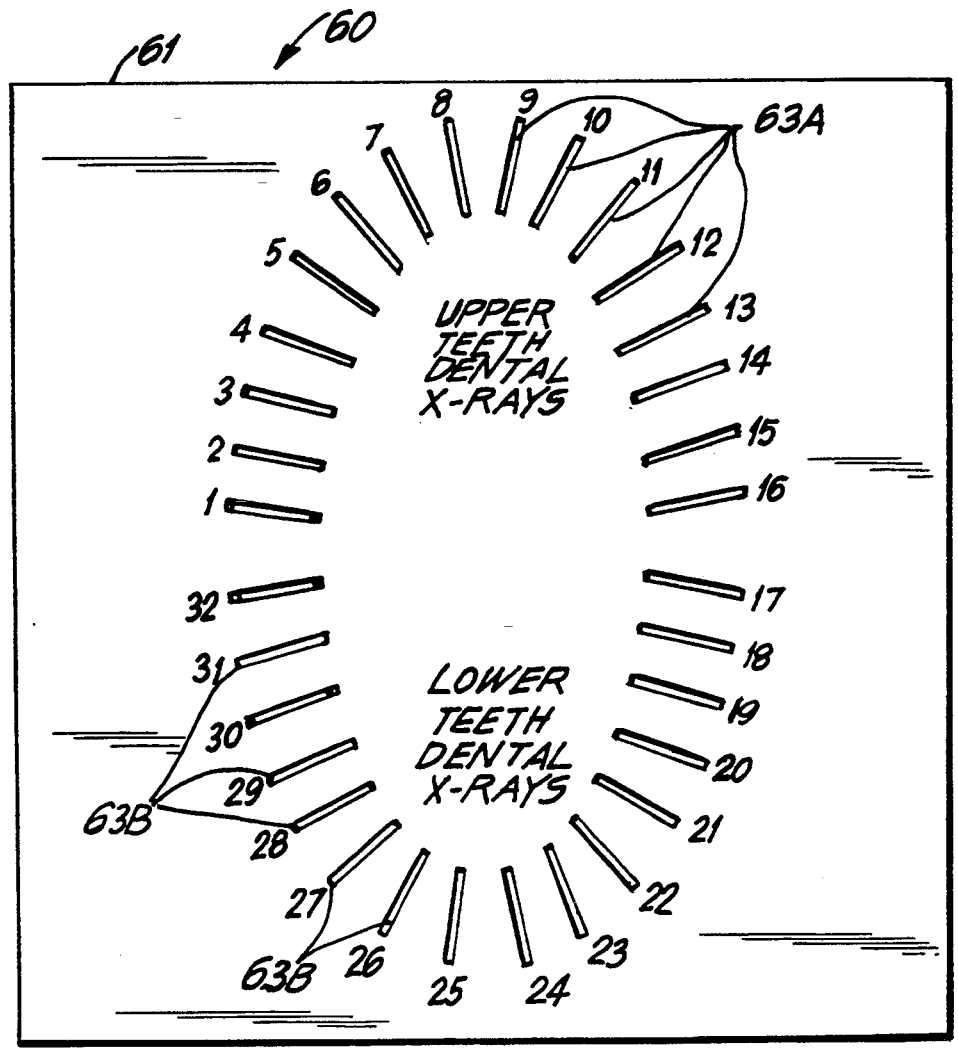
FIG. 10A is a plan view of the portable dental x-ray holding/organizing tray of FIG. 10, showing the plurality of dental x-ray holding slots organized in accordance with the natural spatial arrangement of a patient's upper and lower teeth.

Referring to FIGS. 10 and 10A, the dental x-ray holding/organizing tray of the present invention is shown. As illustrated in FIG. 1, tray 60 comprises a rectangular base portion 61 having dimensions which permit it to be placed within rectangular recess 62 formed in the top portion of the housing of the dental inscription system. Notably, however, the configuration of the base portion may vary from embodiment to embodiment and the recess in the top portion of the housing may be suitably adapted to receive the same. Preferably, the base portion is formed of a lightweight plastic having a first set of sixteen slots 63A for holding dental x-rays of a patient's upper teeth and a second set of sixteen slots 63B for holding dental x-rays of a patient's lower teeth, as shown in FIG. 10A. Preferably, the holding slots are arranged in a pattern similar to that of a patient's upper and lower teeth, in order to facilitate organization of dental x-rays during their exposure, and also during the inscription process of the present invention. In the illustrative embodiment, each slot 63 has a depth dimension extending into the base portion which permits a periapical size dental x-ray within its plastic sanitized covering, to be inserted into the slot and extend substantially perpendicular to the plane of the base portion, as shown in FIG. 10. In order to facilitate the organization of periapical size dental x-rays taken of particular teeth, each holding slot is provided with numerical indicia corresponding to its standard tooth number. While not shown, holding slots may also be provided in tray 60 for palate and panoramic size dental x-rays as well.

The structure and function of the programmable dental x-ray inscription system of the present invention has been described in great detail. It is appropriate at this juncture to describe the process by which the user programs the system and initiates automatic laser inscription of dental x-rays. The detailed description of this process and the operations occurring within the dental x-ray inscription system during the programming cycle and inscription process will be made with reference to FIGS. 11A through 11I. As will become apparent hereinafter, the System Control Program of the illustrative embodiment carries out a menu-driven program which displays user-directed queries and prompts on LCD display panel 5 in order to elicit a desired reaction from the user during particular stages of the programming cycle. In the work environment of a dental office, this approach provides user-friendly system operation, requiring minimal instruction time.

Figure 11A:
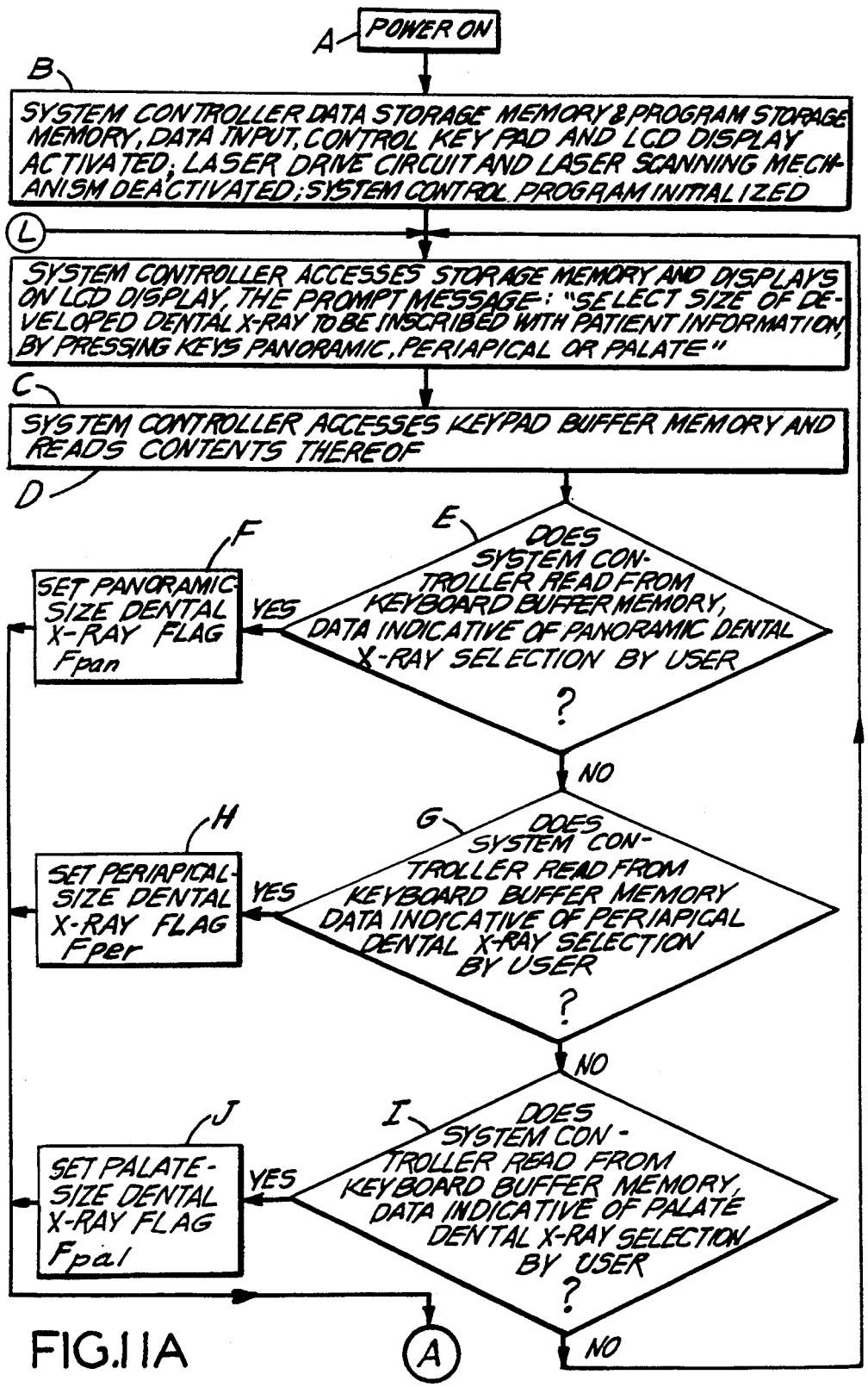
Figure 11B:
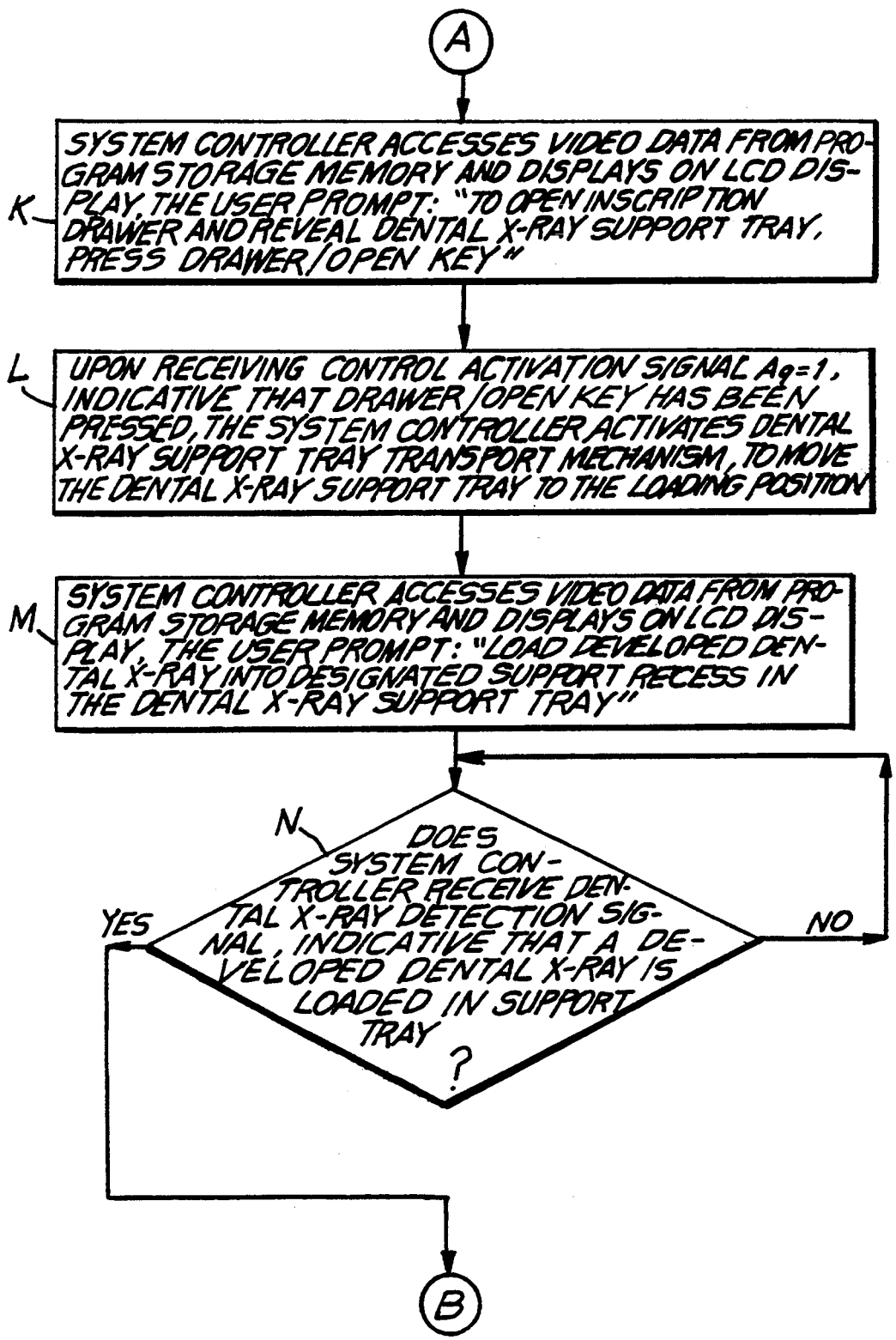
Figure 11C:
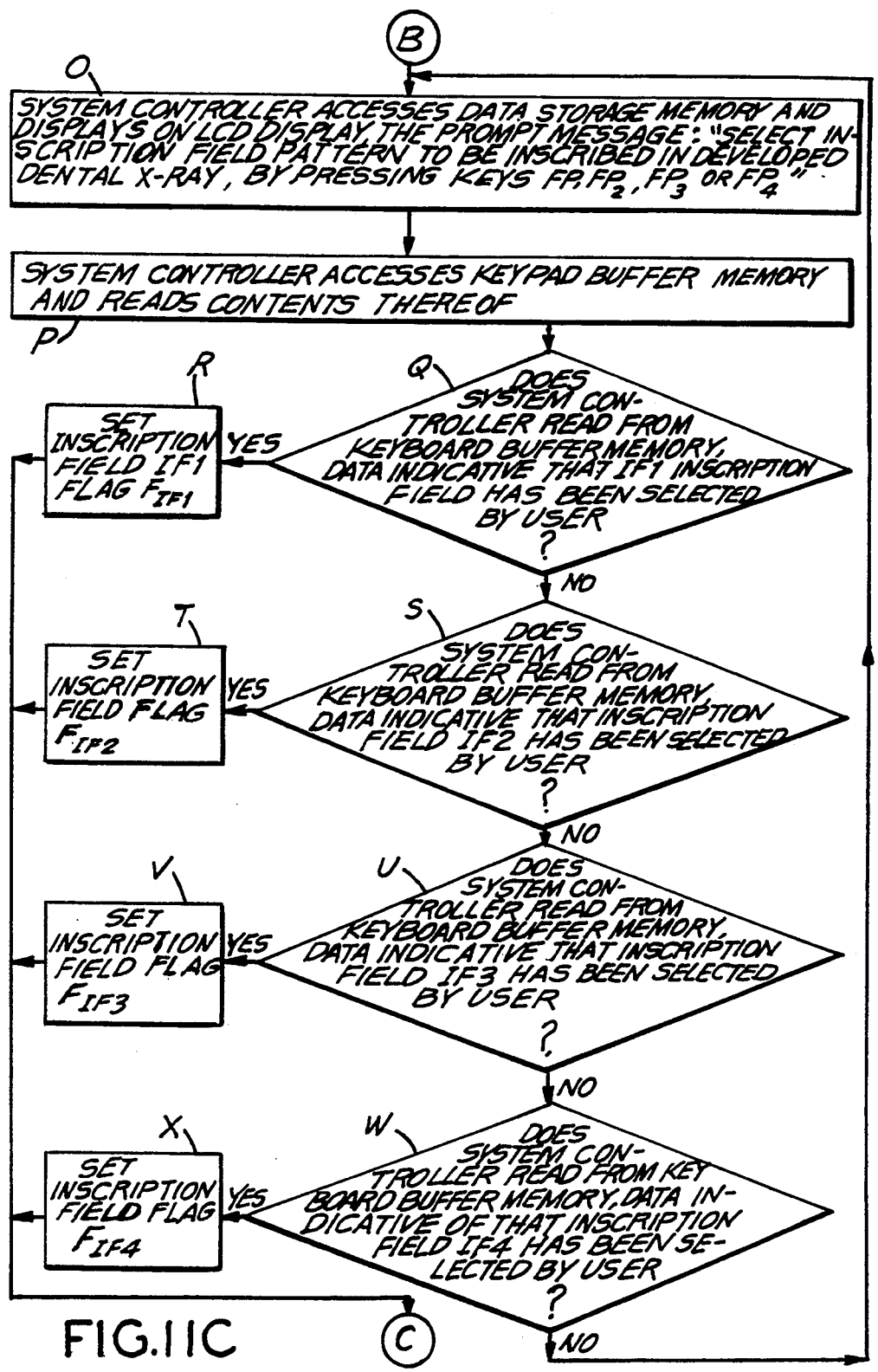
Figure 11D:
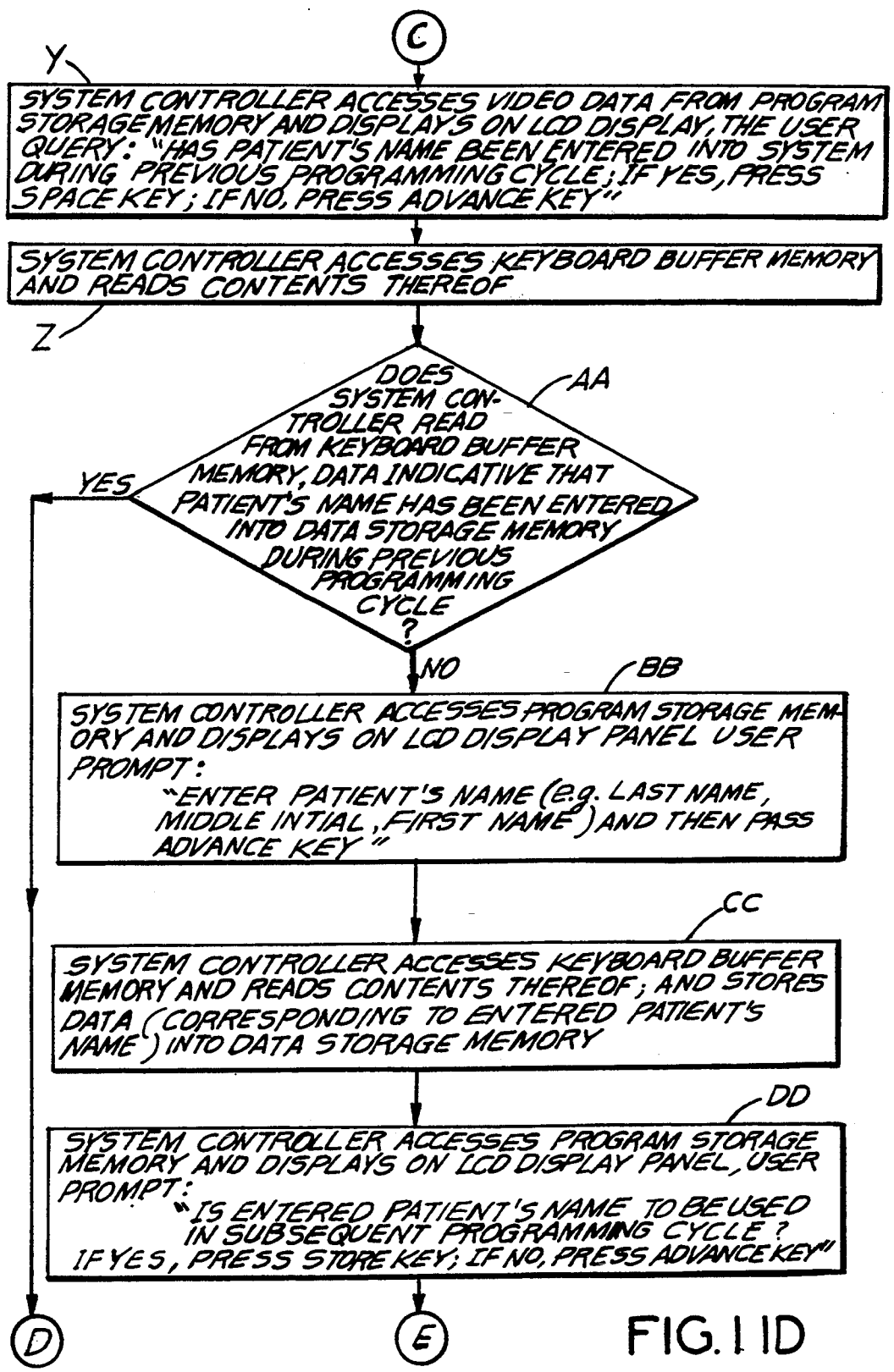
Figure 11E:
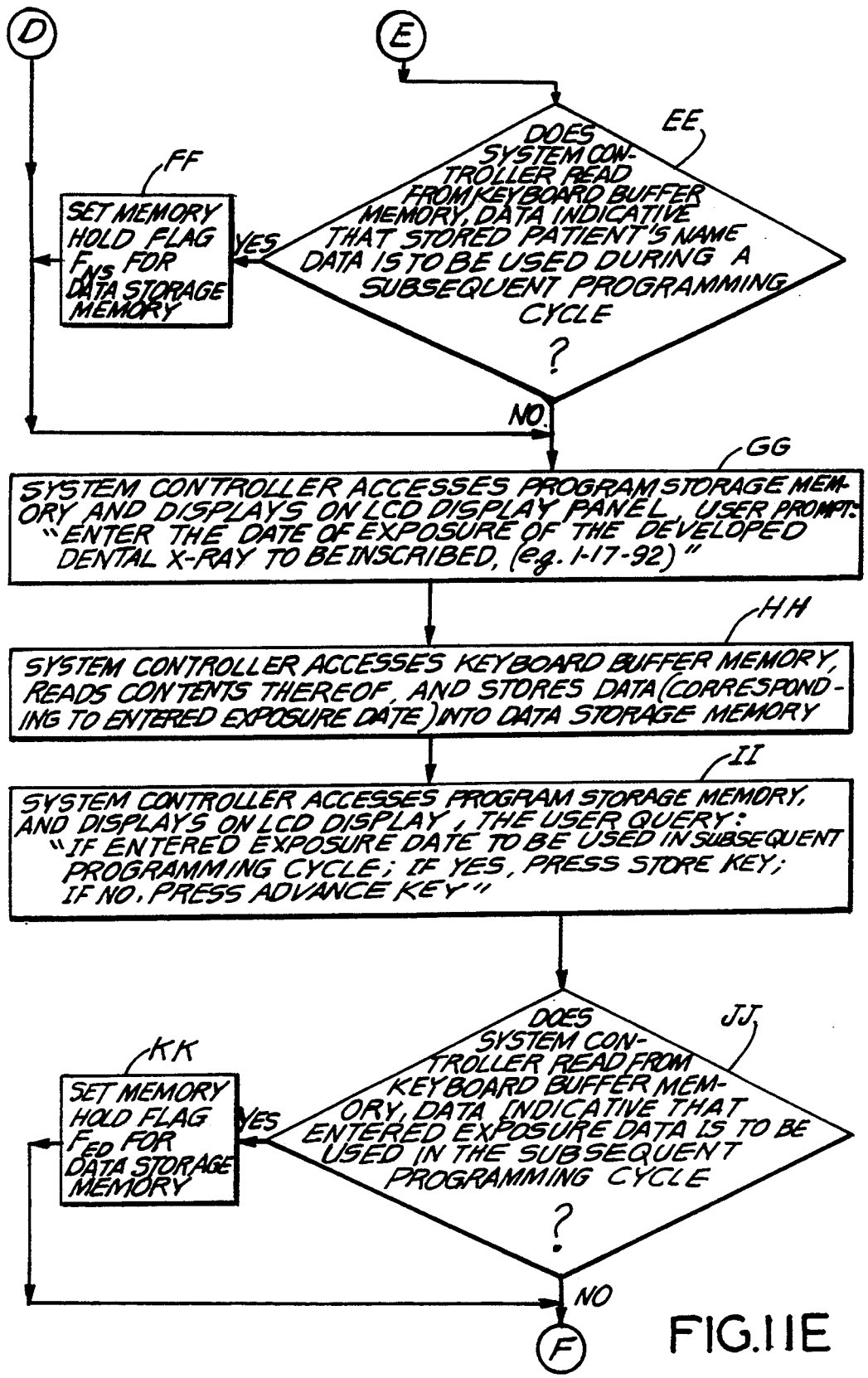
Figure 11F:
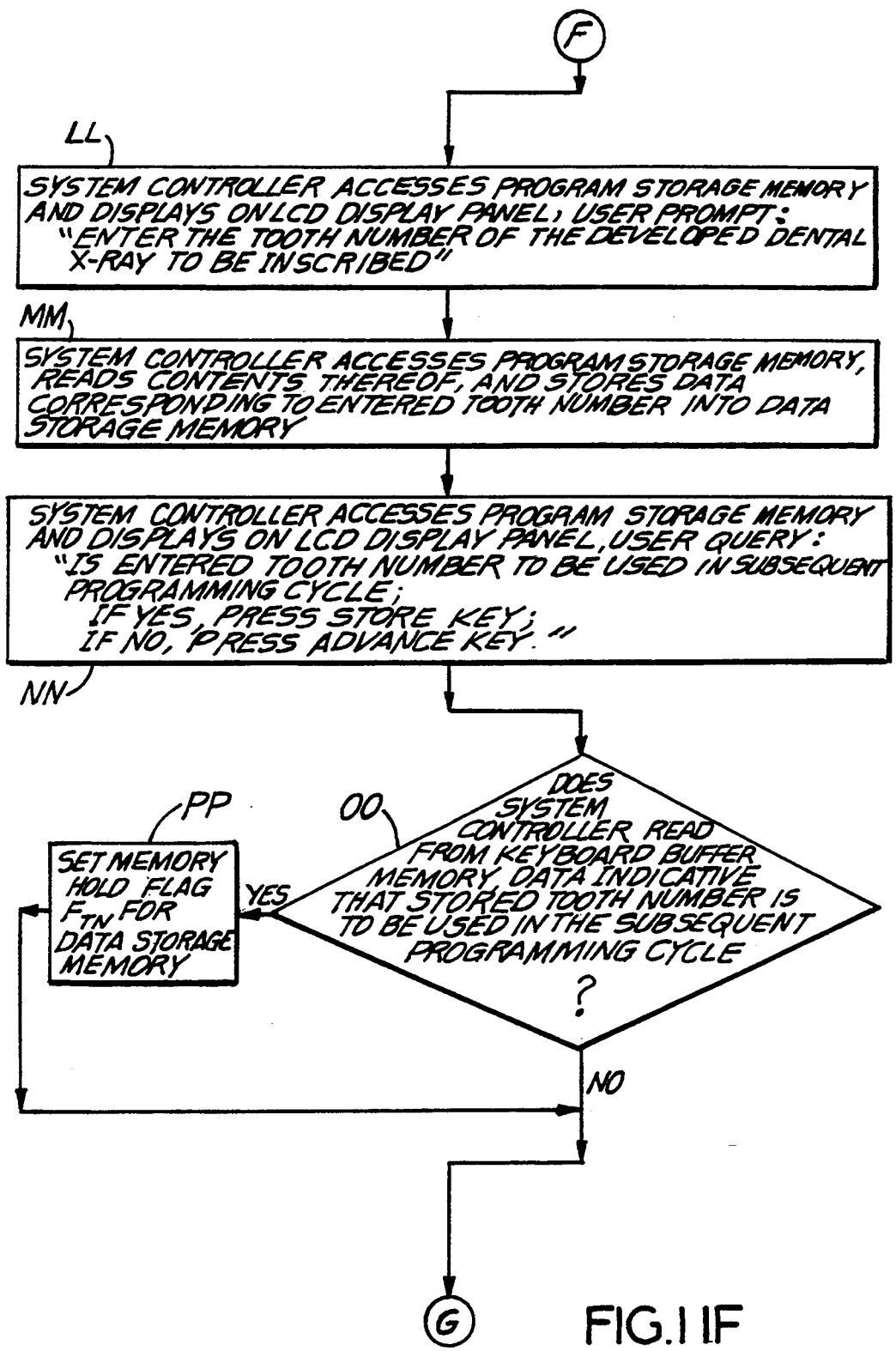
Figure 11G:
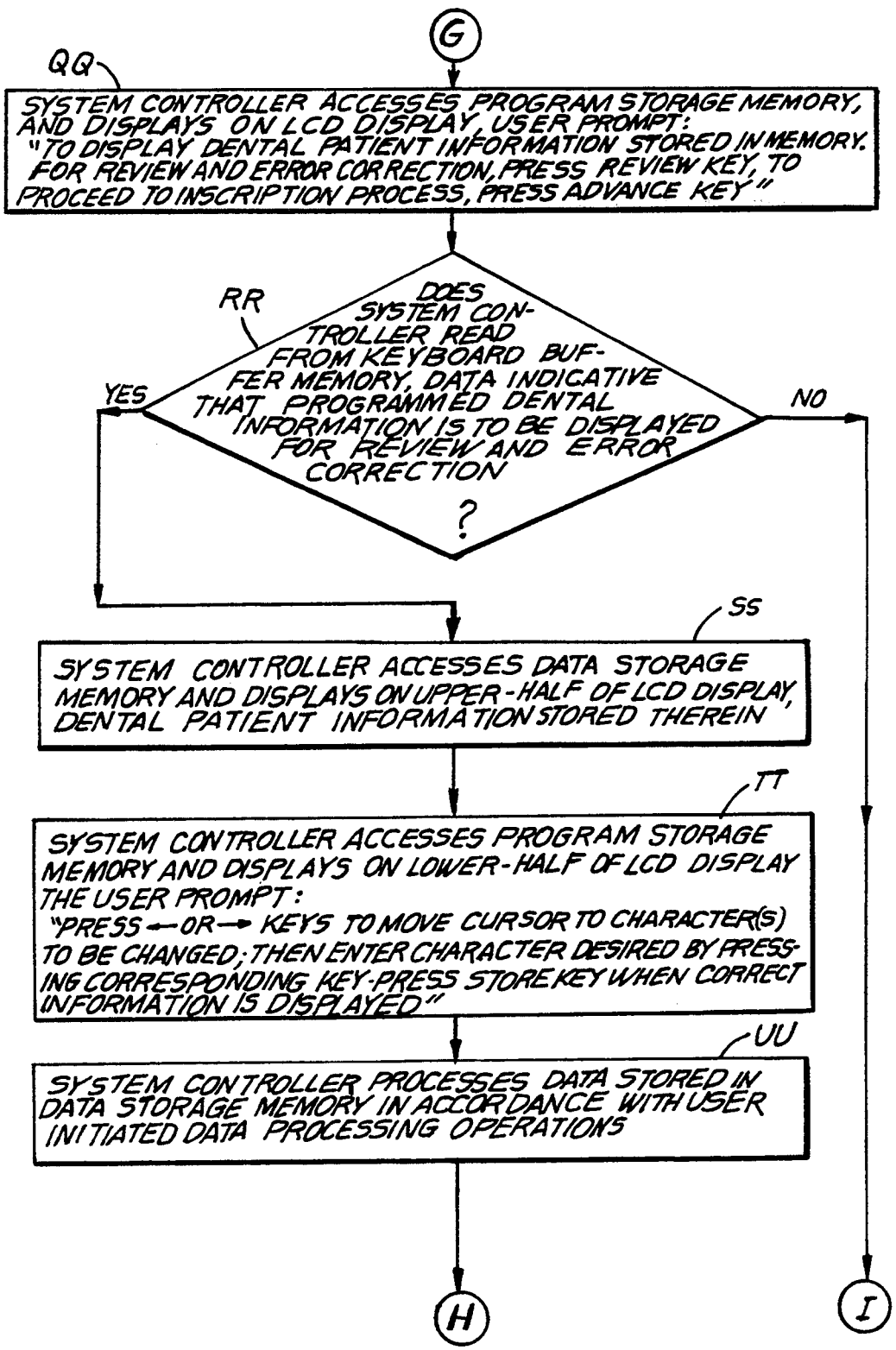
Figure 11H:
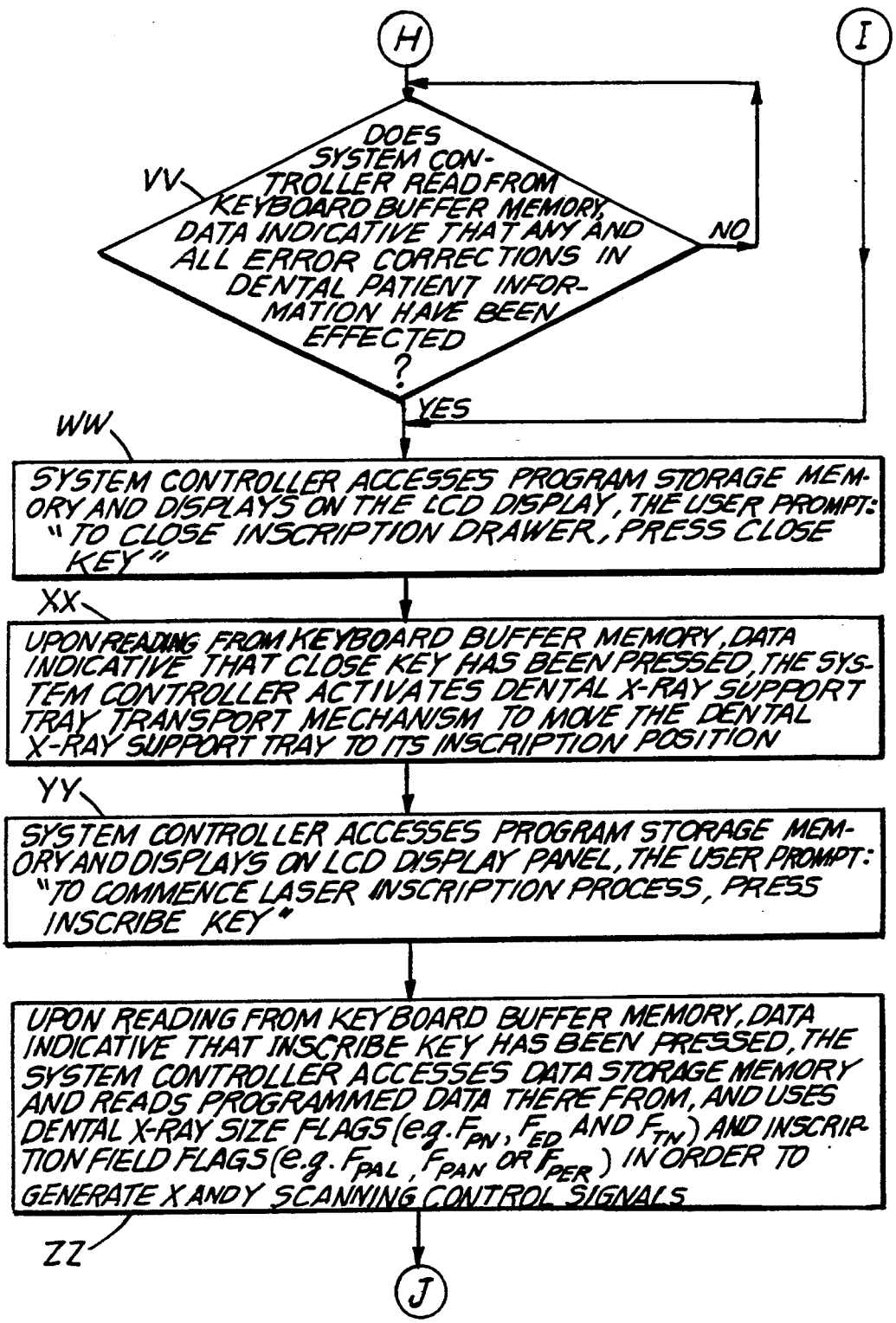
Figure 11J:
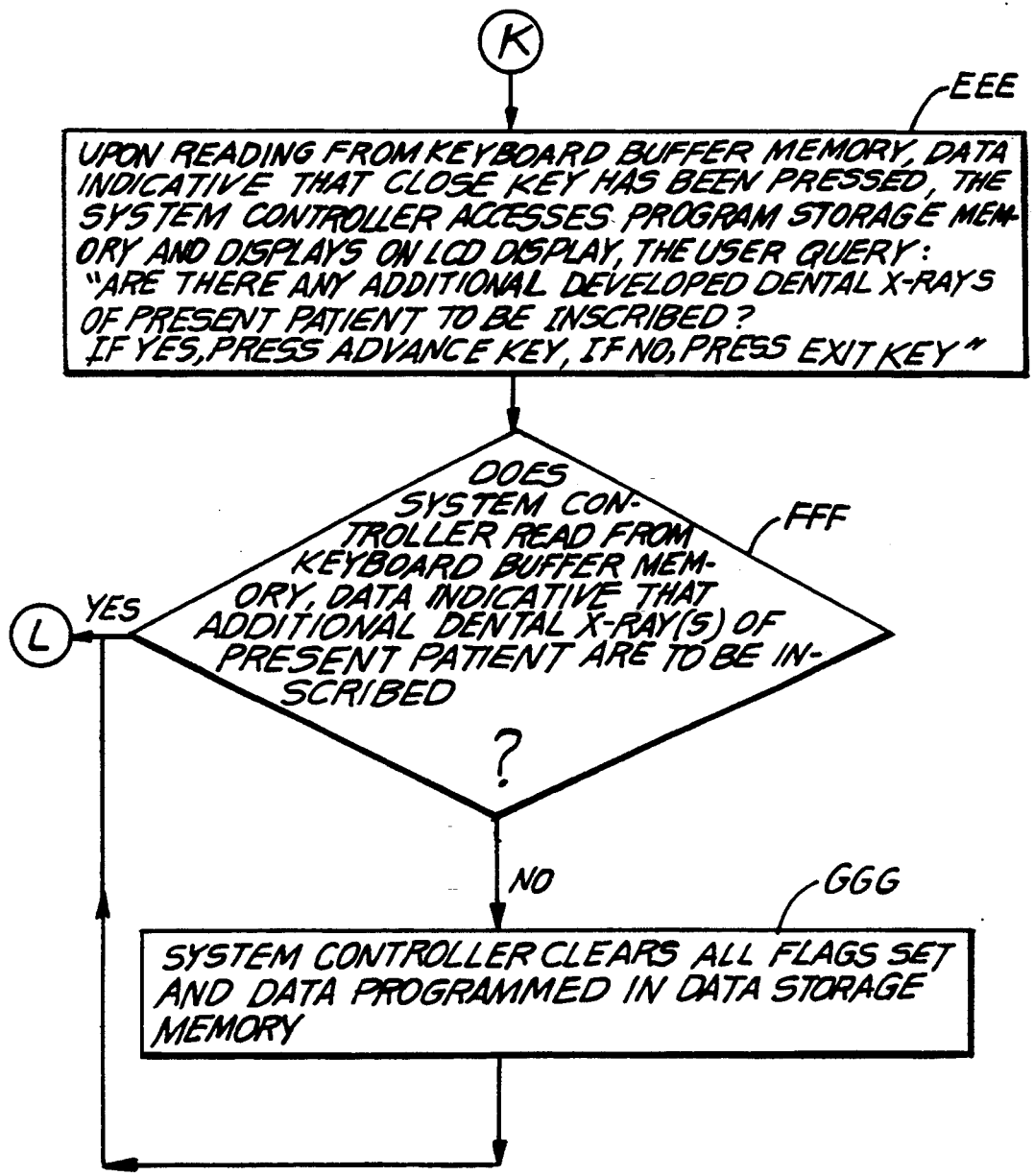

As indicated at Block A of FIG. 11A, upon pressing the "power on" key 65, the system enters Block B and activates (i.e. enables) the system controller, data storage memory 6, program storage memory 21, keyboard panel 22 and LCD display panel 5, while all other system components remain deactivated (disabled). As this stage, the System Control Program is initialized, all flags reset and buffer memory cleared of data contents. As indicated at Block C, the system controller accesses program storage memory 21, reads video data therefrom, and displays on the LCD display panel, the user prompt: "Select Size of Developed Dental X-Ray to be Inscribed with Patient Information, by depressing the 'PANORAMIC', 'PALATE' or 'PERIAPICAL' key." When the user makes his or her selection by depressing either keys 66, 67, or 68 on the keyboard panel, data corresponding to the selected size of dental x-ray is automatically stored in keyboard buffer memory 23 in buffer/interface circuitry 5A. As indicated at Block D, the system controller accesses keyboard buffer memory 23. Then as indicated at Blocks E through J, the system controller determines whether the data read from the keyboard buffer memory indicates user selection of a panoramic, palate or periapical size dental x-ray and then sets a dental x-ray size flag (e.g. F$_{PAN}$, F$_{PAL}$, or F$_{PER}$) in the System Control Program which indicates the user's selection.

As indicated at Block K, the system controller accesses program storage memory 21 and displays on the LCD display panel, the user prompt: "To open the inscription drawer and reveal the dental x-ray support tray, press 'OPEN' key. Upon accessing the keyboard buffer memory 23, the system controller proceeds to lock L and determines whether or not key 69 has been depressed, and if so, executes a Transcription Platform Transport Routine in order to move the dental x-ray support tray to its loading position, as shown in FIG. 1A. Thereafter, system controller then proceeds to block M, at which time the system controller accesses program storage means 21, reads video data therefrom, and displays on the LCD display panel, the user prompt: "Load developed dental x-ray into designated mounting recess in the dental x-ray support tray."

At Block N, the system controller determines whether or not a dental x-ray of the size previously selected by the user, has been detected within the support tray by dental x-ray detection circuit 11. When it has been detected, the system controller proceeds to Block D where it accesses once again program storage memory 21, reads video data therefrom, and displays on the LCD display panel, the user prompt: "Select inscription field to be inscribed in the mounted developed dental x-ray, by depressing the key 'IF1, IF2, IF3 or IF4'." When the user makes his or her selection of inscription field by depressing either keys 70, 71, 72 or 73 on the keyboard panel, data corresponding to the selected inscription field is automatically stored in keyboard buffer memory 23. As indicated at Block B, the system controller accesses keyboard buffer memory 23 then, as indicated at Blocks Q through X, the system controller determines whether or not the data read from the keyboard properly indicates user selection of inscription field IF1, IF2, IF3 or IF4, illustrated in FIGS. 7B, 8B and 9B, and, if so, sets a flag (e.g. F$_{IF1}$, F$_{IF2}$, F$_{IF3}$ or F$_{IF4}$) which indicates of the user's selection.

Proceeding to Block Y, the System Controller accesses program storage memory, reads video data therefrom, and displays on the LCD display panel, the user query: "Has patient's name been entered into system during the previous programming cycle? If yes, then press 'RECALL' key; if no, press 'ADVANCE' key". Upon accessing keyboard buffer memory 23, as indicated in Block Z, the system controller proceeds to determine at Block AA, whether the data read from the keyboard buffer memory, indicates that the patient's name has been previously entered into memory during the previously programming cycle. This corresponds to depressing key 75. If so, the system controller skips Blocks BB through FF, and proceeds directly to Block GG. If, however, data corresponding to the present patient's name has not been previously entered into memory indicative that key 76 has been depressed, then the system controller proceeds to Block BB. As indicated at this Block, the system controller accesses program storage memory 2, reads video data therefrom, and displays on the LCD display panel, the user prompt: "Enter patient's name (e.g. first name, middle initial, last name), social security number, and then press 'ADVANCE' key." As indicated at Block C, the system controller accesses keyboard buffer 23, reads data contents therefrom, and stores in data storage buffer 6, entered data corresponding to the patient's name and social security number.

Proceedings to Block DD, the system controller accesses program storage memory-, reads video data therefrom, and displays on the LCD display panel, the user prompt: "Is entered data corresponding to the patient's name and social security number to be used in the subsequent programming cycle? If yes, press 'STORE' key; if no, press 'ADVANCE' key." When the user makes his or her selection by depressing either key 76 or 77, data corresponding to these control functions is automatically entered into the keyboard buffer memory. Upon accessing the keyboard buffer memory, the system controller proceeds at Block EE, to determine whether the data read from the keyboard buffer memory indicates that the name and social security number of the patient is to be used during the immediately subsequent programming cycle. If so, the system controller sets in the System Control Program, a memory hold flag $F_{NS}$ for data storage memory. If not, then the system controller proceeds to Block GG, at which the system controller accesses data storage memory, reads video data therefrom, and displays on the LCD display panel, the user prompt: "Enter the date of exposure of the developed dental x-ray to be inscribed (e.g. Jul. 14, 1992)". Then, as indicated at Block HH, the system controller accesses keyboard buffer memory 23, reads the data contents thereof, and stores in data storage memory 6 entered data corresponding to the x-ray exposure date.

The system controller proceeds to Block II, access program storage memory 21, reads video data therefrom, and displays on the LCD display panel, the user query: "Is entered exposure data to be used in subsequent programming cycle; if yes, press 'STORE' key; if no, press 'ADVANCE' Key." Upon accessing the keyboard buffer memory 23 the system controller proceeds to Block JJ to determine whether the data read from the keyboard buffer memory indicates that the entered exposure date is to be used in the immediately subsequent programming cycle. If so, the system controller sets a memory hold flag FED for data storage memory. If not, then the system controller proceeds to Block LL at which it accesses program storage memory, reads video data therefrom and displays on the LCD display panel, the user prompt: "Enter the tooth number of the developed dental x-ray to be inscribed." As indicated at Block MM, the system controller accesses the keyboard buffer memory, reads the data contents therefrom and stores in data storage buffer 6, the data corresponding to the entered tooth number.

Proceeding to Block NN, the system controller accesses program storage buffer 23, reads video data therefrom and displays on the LCD displays panel, the user query: "Is the entered tooth number to be used in the immediately subsequent programming cycle?" If yes, press 'STORE' Key; if no, press 'ADVANCE' Key." Upon accessing the keyboard buffer memory, the system controller proceeds to Block OO to determine whether the data read therefrom indicates that entered tooth number is to be used in the immediately subsequent programming cycle. If so, the system controller sets a memory hold flag $F_{TN}$ for data storage memory 6. If not, the system controller proceeds to Block QQ at which it accesses program storage memory 21, reads video data therefrom and displays on the LCD display panel, the uers prompt: To display programmed dental patient information for purposes of review and error correction, press 'REVIEW' Key; to proceed to the inscription process, press 'ADVANCE' Key." Upon accessing the keyboard buffer memory, the system controller proceeds to Block RR to determine whether the data read from the keyboard buffer memory indicates that the programmed dental patient information is to be displayed for purposes of review and error correction. If not, the system controller skips Blocks SS through W, and proceeds directly to Block WW. If, however, the data indicates that the programmed dental patient information is to be displayed for purposes of review and error correction, then the system controller accesses data storage buffer 6, reads the programmed dental patient data therefrom and displays an upper-half of LCD display panel, dental patient information presently programmed into the system.

As indicated at Block II, the system controller accesses data storage memory 6, reads video data therefrom and displays on the lower-half of the LCD display panel, the user prompt: "Press ← or → keys to move the cursor to character(s) to be changed. Enter the desired character(s) by pressing the corresponding key(s); then press 'STORE' Key when correct dental patient information is displayed." Then as indicated Block UU, the system controller automatically changes data programmed in data storage memory 6 in accordance with user initiated data processing operations.

The system controller then proceeds to Block VV, reads keyboard buffer memory 23, and determines whether data read therefrom indicates that all errors in programmed dental patient information have been corrected. When the data produced from depressing the 'STORE' Key is read from the keyboard buffer memory, the system controller proceeds to Block WW, at which it accesses program storage memory 21, read video data therefrom and displays on the LCD display panel, the user prompt: "To close inscription drawer and retract the dental x-ray support tray, press 'CLOSE' Key." The system controller accesses data storage memory 6, reads data therefrom and upon reading data that indicates the 'CLOSE' key 77 has been depressed, the system controller executes a second Inscription Platform Transport Routine which, in effect, activates inscription platform transport mechanism 10 so as to retract the inscription platform and thus the dental x-ray support tray, into the inscription position as illustrated in FIGS. 7, 8 and 9.

As indicated at Block YY, the system controller accesses program storage memory 21, reads video data therefrom and displays on the LCD display panel, the user prompt: "Programming cycle complete. To commence laser inscription process, press 'INSCRIBE' key." Then, the system controller accesses the keyboard buffer memory and upon reading data that indicates the 'INSCRIBE' key 78 has been depressed, the system controller accesses data storage memory 6, reads therefrom data presentative of the programmed patient identifying indicia, and checks the dental x-ray size flag (set during the programming cycle) so as to now select the Panoramic, Palate or Periapical Coordinate Computing Routine described in great detail hereinabove.

As indicated, at Block 22, the system controller executes the selected Coordinate Computing Routine so as to generate and store scanner control signals $X_i(t)$ and $Y_i(t)$, laser control signal $Z_i(t)$ for all points along the locus of points $\{P_{di}(x,y,z)\}$ within the selected inscription field.

Then, after generating scanner control signals $X_i(t)$, $Y_i(t)$, and laser control signal $Z_i(t)$, the system controller automatically proceeds to Block AAA. At this control block, the system controller downloads from storage memory, the Laser Inscription Routine of the System Control Program, which is then executed. In operation, the Laser Inscription Routine generates and transmits control signals to driver/interface circuitry 15 which activates power supply 14, laser 13, while shuttering the laser beam from the laser beam scanning mechanism. After a predetermined warm-up period and various diagnostic checks, the Laser Inscription Routine applies scanner control signals $X_i(t)$ and $Y_i(t)$ to driver/interface circuitry 17A, and laser control signal $Z_i(t)$ at a predetermined time period thereafter, which permits the laser beam to pass to the optics of the laser beam scanning mechanism. In response, driver/interface circuitry 17A and 15 convert scanner control signals $X_i(t)$ and $Y_i(t)$ and laser control signal $Z_i(t)$ into scanner drive signals $x_i(t)$ and $y_i(t)$ and laser drive signal $z_i(t)$, respectively. In response, these signals drive the various electro-optical and electro-mechanical components of the laser beam scanning mechanism and thereby scan the laser beam along the locus of points $\{P_{di}(X,y,Z)\}$ within the selected inscription field on the dental x-ray mounted within the support tray.

Upon completion of the laser inscription process, the system controller proceeds to Block BBB, where the Laser Inscription Routine deactivates power supply 14, laser drive/interface circuitry 15, and the laser beam scanning mechanism 17. Then, the system controller accesses program memory storage 21, reads video data therefrom and display on the LCD display panel, the user prompt: "Laser inscription of the dental x-ray is complete: to open inscription drawer and reveal inscribed dental x-ray, press 'OPEN Key'". The system controller accesses keyboard buffer memory 23, reads data therefrom and upon reading data that indicates the 'OPEN' key 67 has been depressed, the system controller executes the first Inscription Platform Transport Routine which activates the inscription platform transport mechanism so as to protract the inscription platform and thus the dental x-ray support tray into the dental x-ray unloading position, as illustrated in FIG. 1A.

At Block CCC, the system controller checks to determine whether a dental x-ray detection signal is received from dental x-ray detection circuit 11. When the system controller receives this signal, the system controller proceeds to Block DDD, at which it accesses program storage memory 21, reads video data therefrom and displays on the LCD display panel, the user prompt: "To close inscription drawer, press 'CLOSE' key". Then, at block EEE, the system controller accesses keyboard buffer memory 23, and upon reading data therefrom that indicates the 'CLOSE' key 77 has been pressed, accesses program storage memory 21, reads video data therefrom and displays on the LCD display panel, the user query: "Are there any additional developed dental x-rays of the present patient, which are to be inscribed; if yes, press 'ADVANCE' key; if no, press 'EXIT' key". At Block FFF, the system controller accesses keyboard buffer memory 23, reads the data contents therefrom and determines whether the data read indicates that the 'ADVANCE' key has been depressed. If the 'ADVANCE' key 76 has been depressed, the system controller returns to Block C, while permitting flagged data in data storage memory 6 to remain as programmed for the next programming cycle/inscription process. If, however, there are no other dental x-rays to be inscribed for the particular patient of concern, the user presses 'EXIT' key 79 causing the system controller proceeds to Block GGG. As indicated, the system controller clears all flags set during the programming cycle, as well as all data programmed in data storage memory 6 relating to patient identifying indicia. Thereafter, the system controller returns to Block C and enters a new programming cycle for a different patient.

Figure 12:
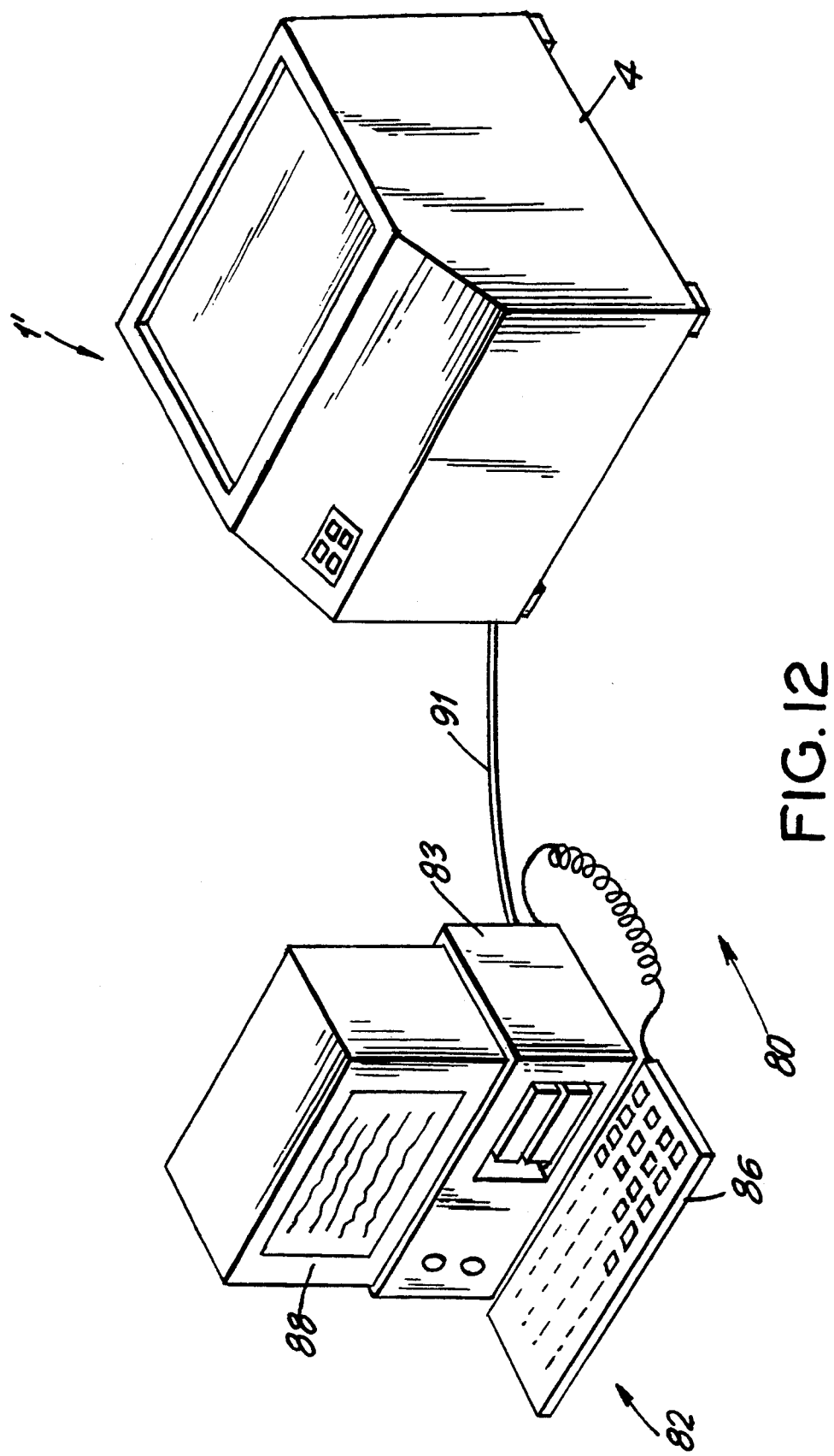
FIG. 12 is a perspective view of the programmable dental x-ray inscription workstation in accordance with the second illustrative embodiment of the present invention.
Figure 13:
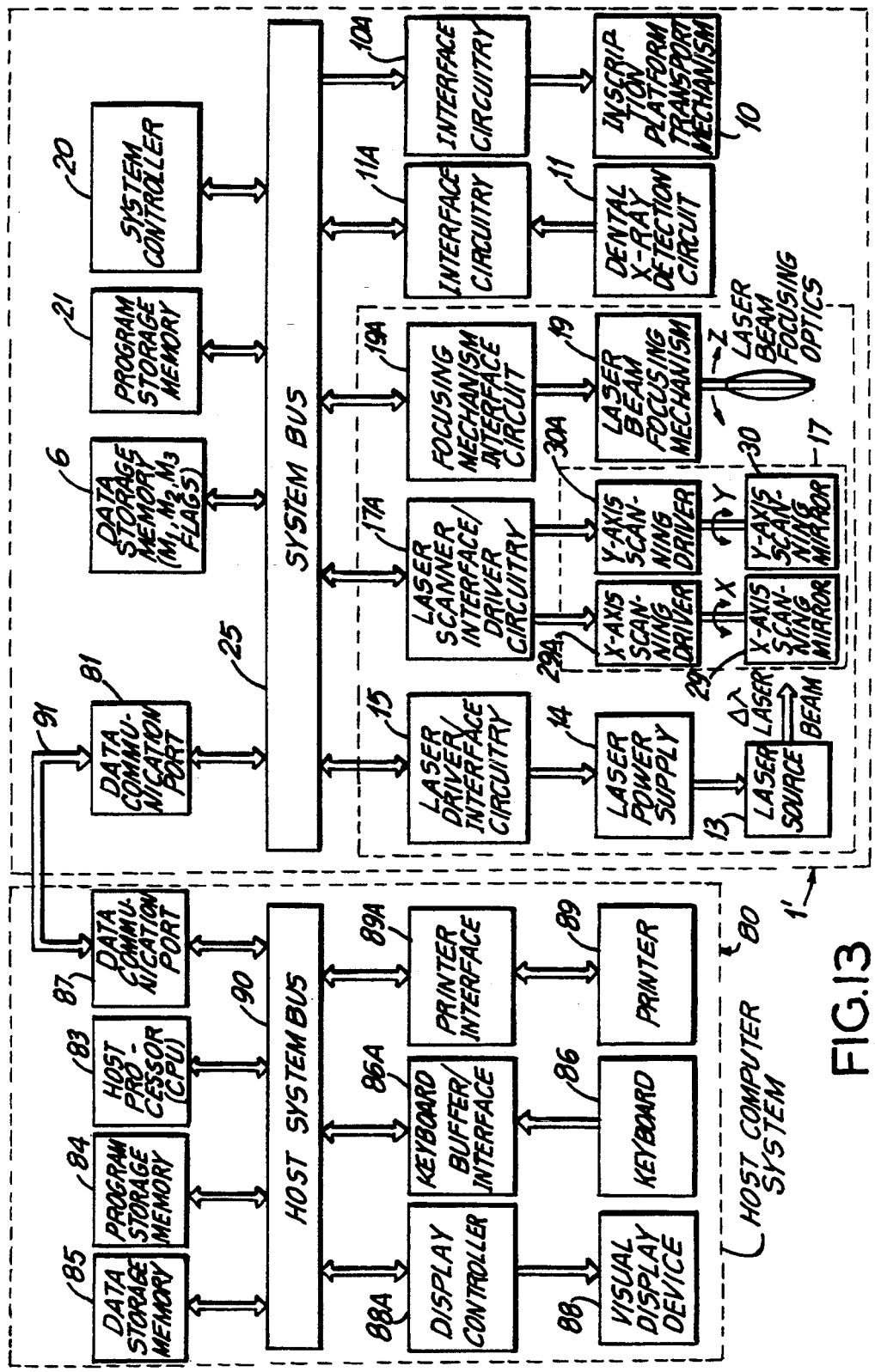
FIG. 13 is a block schematic diagram of the programmable dental x-ray inscription workstation illustrated in FIG. 12.

Having described the operation of the programmable dental inscription system of the first illustrative embodiment of the invention, reference is now made to FIGS. 12 and 13, in which a second illustrative embodiment of the programmable dental inscription system is shown.

In FIG. 12, programmable dental inscription system 80 is realized in the form of a countertop unit. As illustrated in FIG. 13, dental inscription system 80 is similar to dental inscription system 1 of FIGS. 1 through 9B, except that instead of having a keyboard panel, an LCD display panel and associated interface circuitry, it includes a data communication port 81 which permits dental inscription system 1 to be interfaced with a conventional computer system 82.

As illustrated in FIG. 13, computer system typically comprises a host processor (e.g. CPU) 83; program storage memory 84; data storage memory 85; keyboard 86, and interface circuitry 86A; data communication port 87; visual display unit (e.g. CRT or LCD display device) 88 and interface circuitry 88A, and a printer 89 and associated interface circuitry 39A. As shown, all of these system components are operably associated host processor 87 through a conventional system bus 90. By interfacing data communication ports 81 and 87 by way of a data communication channel (e.g. cable or LAN) 91, and providing program storage memory 84 with program software suitably adapted to the System Control Program of dental x-ray inscription system 1, the host computer system can carry out all of the functions provided by keyboard 86 and display panel 88 available to the programmable dental x-ray inscription system of the first illustrative embodiment 1.

In addition to permanently marking developed dental x-rays, the programmable dental x-ray inscription system of the present invention can be utilized to provide an improved method of processing dental insurance claims. This method will be described with particular reference to FIGS. 14 through 16.

Figure 16:
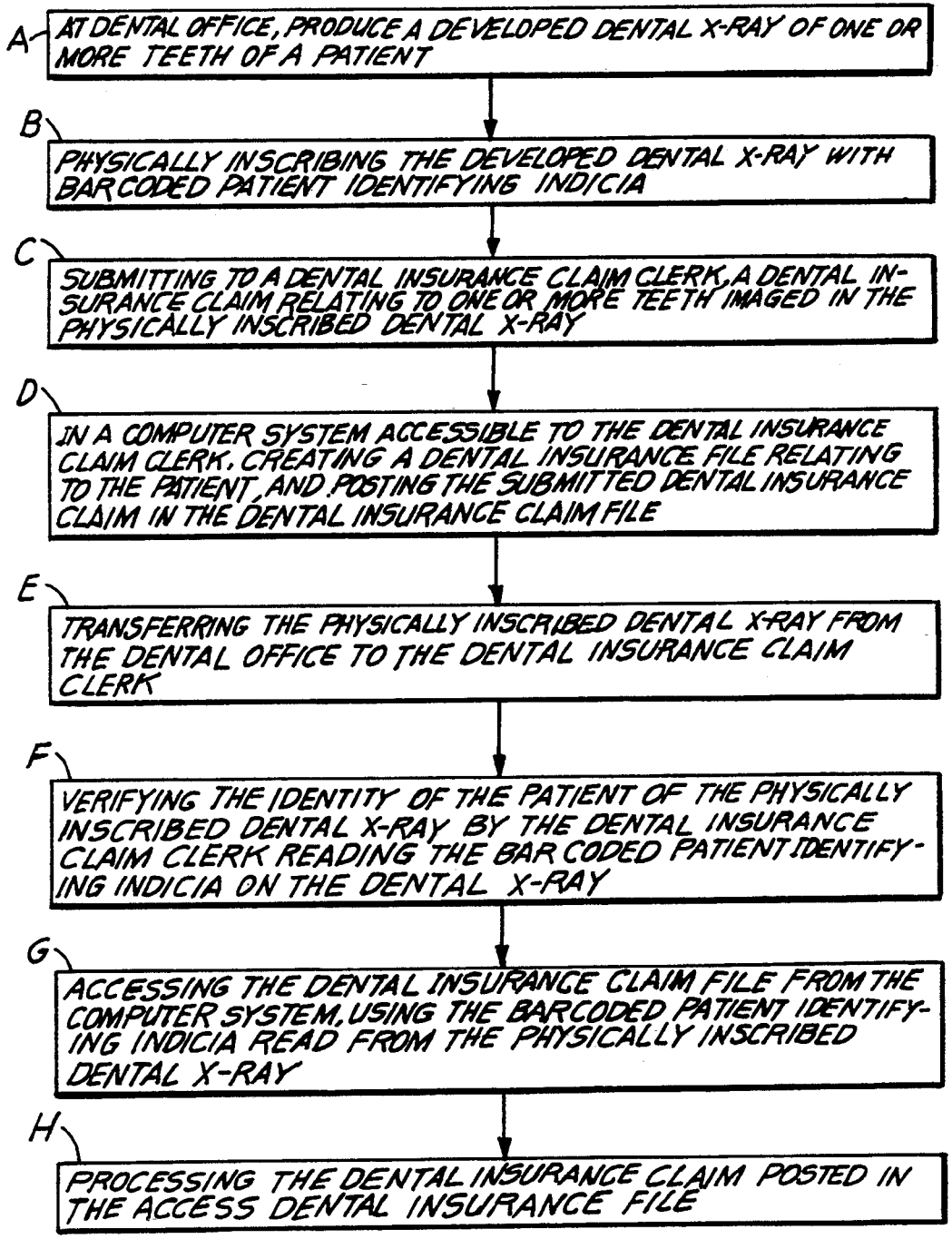
FIG. 16 is a high level block diagram illustrating the steps involved in carrying out the method of dental insurance claim processing in accordance with the present invention.

As indicated at Block A of FIG. 16, the first step of the dental claim processing method of the present invention involves producing, at a dental office or clinic, a developed dental x-ray in a conventional manner. This is achieved by exposing a particular size x-ray of one or more teeth of a particular patient, and thereafter developing the exposed dental x-ray in a manner known in the art.

Figure 14:
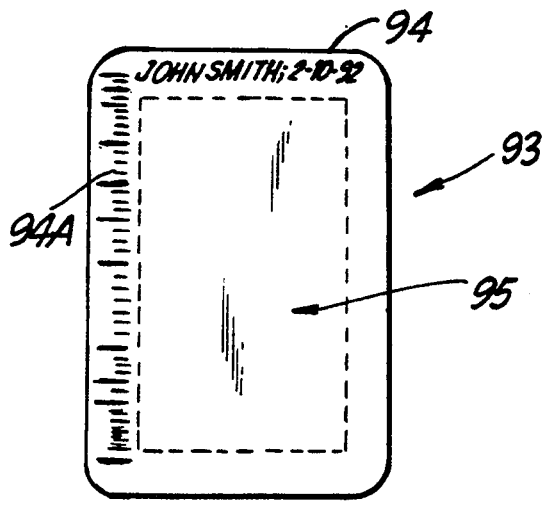
FIG. 14 is a plan view of a periapical size dental x-ray permanently marked in accordance with the principles of the present invention.

As indicated at Block B of FIG. 16, the second step of the method involves physically inscribing a developed dental x-ray 93 with patient identifying indicia 94 using the programmable dental x-ray inscription system of the present invention, described above. As illustrated in FIG. 14, the patient identifying indicia preferably includes an optically opaque bar code symbol 94A constructed, for example, according to the POSTNET symbology presently used by the U.S. Postal Service. In the illustrative embodiment, bar code symbol 94A represents the patient's nine digit social security number or assigned dental insurance carrier number. In addition, the inscribed patient identifying indicia includes the patient's name, the date of exposure of the dental x-ray and/or the tooth number. The particular inscription fields within which these informational items are physically inscribed can be selected by the user, or automatically selected by the programmable dental x-ray inscription system during the programming cycle thereof. As shown in FIG. 14, the patient identifying indicia is inscribed about the perimetrical border regions of the dental x-ray, so as to not affect central region 95 bearing the x-ray image of the patient's teeth.

As indicated at Block C of FIG. 16, the patient whose teeth have been represented in the physically inscribed dental x-ray, submits a dental insurance claim to a clerk within or associated with the dental insurance claim department of the patient's dental insurance carrier. This dental insurance claim relates to one or more of the teeth depicted in the physically inscribed dental x-ray, and may actually be submitted by the patient, or by a staff member of the dental office who has accepted assignment of payment under the dental insurance claim.

Figure 15:
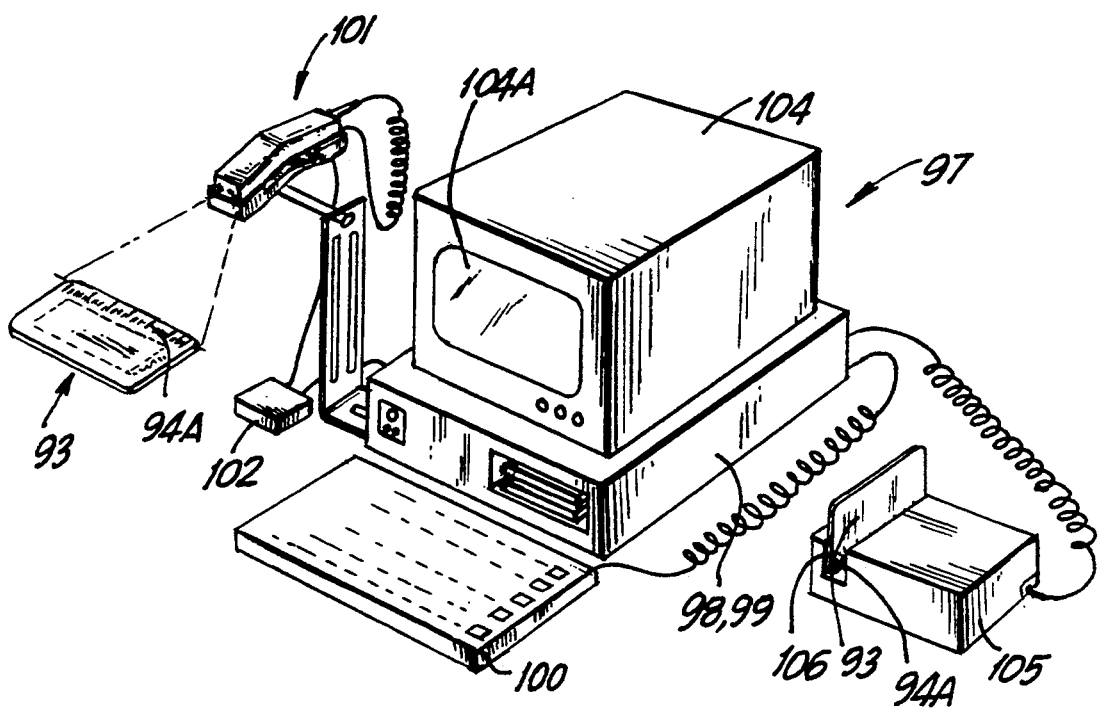
FIG. 15 is a perspective view of the dental claim processing system of the present invention, illustrating its use in automatic patient identification using bar code symbol reading technology.

As indicated at Block D, the claim clerk will have access to a computer system 97, preferably of the type illustrated in FIG. 15. In the illustrative embodiment, computer system 97 comprises host processor 98 with associated program and data storage memory 99; keyboard 100; and bar code symbol reader 101 interfaced with the host processor by a keyboard wedge 102, operably connected to input port 103 and a visual display device 104 operably connected to the host processor in a conventional manner. Bar code symbol reader 101 can be realized as an automatic laser-based bar code symbol reading system such as, for example, Model MS950 from Metrologic Instruments, Inc. of Blackwood, N.J. Keyboard wedge 102 can be realized as Model MI951, also commercially available from Metrologic Instruments, Inc. Alternatively, a bar code symbol reading device 105 having a slot 106 can be utilized to read bar code symbol 94A on inscribed dental x-ray 93, by simply sliding dental x-ray 93 through slot 106 in a manner similar to reading magnetic stripe cards when using a conventional magnetic stripe reading device.

As indicated at Block D in FIG. 16, the claim clerk creates in computer system 97, a dental insurance file relating to the patient having dental insurance under a insurance program. Upon receiving the submitted dental insurance claim, it is posted in the dental insurance file relating to the patient submitting the claim. Then, the physically inscribed dental x-ray relating to the posted insurance claim, is transferred from the dental office to the dental insurance claim clerk, as indicated at Block F.

As indicated at Block G in FIG. 16, the identity of the patient of the physically inscribed dental x-ray received by the claim clerk is then verified by reading the patient identifying indicia on the physically inscribed dental x-ray. In the illustrative embodiment, this step is achieved by reading bar code symbol 94A on the developed dental x-ray, using either bar code symbol reader 101 or 105. Once the bar code symbol is successfully read (i.e. scanned and decoded), data corresponding to the patient's identity is automatically entered into computer system 97, which, as indicated at Block H of FIG. 16, automatically accesses the patient's dental insurance file and the posted dental insurance claim, and then displays a video display screen 107 corresponding thereto on display screen 104A of the visual display device. Finally, as indicated at Block I, with dental insurance file 107 displayed on the display screen 104A, the posted dental insurance claim can be processed in a conventional manner known in the insurance claim processing art.

Having described the illustrative embodiments of the present invention, several modifications come to mind.

In particular, the physical inscription forming mechanism of the illustrative embodiment has been realized as a laser inscription mechanism. However, alternative inscription mechanisms under the control of system controller 20 may be utilized with acceptable results. For example, such alternative inscription mechanisms may include automated embossing, thermal stamping or engraving operations carried out using instrumentalities well known in the art.

While preferred embodiments of the system and method of the present invention have been described, it will be appreciated that variations and modifications of the present invention will occur to persons skilled in the art, and that all such modifications shall be within the scope and spirit of the appended claims.

What is claimed is:

1. A programmable dental x-ray inscription system, which comprises:

a housing positionable on a work surface;

data storage means disposed in said housing, for storing data representative of selected patient identifying indicia identifying a patient and the exposure date of a developed dental x-ray having a central region containing an x-ray image of said patient's teeth and a perimetrical border region about said central region;

data input means disposed in said housing, for programming said data in said data storage means;

display means disposed in said housing, for displaying said selected patient identifying indicia;

physical inscription forming means disposed in said housing, for forming in a portion of said perimetrical border region, physical inscriptions having a depth dimension extending into said developed dental x-ray and corresponding to said selected patient identifying indicia;

control means disposed in said housing and operably associated with said data storage means, said data input means, said display means and said physical inscription forming means, and for causing said display means to display said selected patient identifying indicia, and for controlling the operation of said physical inscription forming means so as to form said physical inscriptions only within said portion of said perimetrical border region and without adversely affecting said x-ray image in said central region.

2. The programmable dental x-ray inscription system of claim 1, further comprises dental x-ray support means for supporting said developed dental x-ray during the formation of said physical inscriptions in said developed dental x-ray, and transport means for transporting said dental x-ray support means between at least a first position and a second position, wherein said developed dental x-ray is placed in said dental x-ray support means when said dental x-ray support means is disposed in said first position, and wherein said physical inscriptions are formed when said developed dental x-ray is supported in said dental x-ray support means and said dental x-ray support means is disposed in said second position.

3. The programmable dental x-ray inscription system of claim 2, which further comprises detection means for detecting the presence of said developed dental x-rays supported in said dental x-ray support means, and automatically producing in response thereto, a dental x-ray detection signal.

4. The programmable dental x-ray inscription system of claim 3, wherein said detection means comprises an infrared light emitting diode transmitting an infrared light signal and an infrared light photoreceiving diode for detecting transmitted infrared light reflected off said developed dental x-ray disposed in said dental x-ray support means, and in response thereto producing said dental x-ray detection signal.

5. The programmable dental x-ray inscription system of claim 2, wherein said dental x-ray support means comprises a support tray having a first recess for receiving a developed periapical-size dental x-ray.

6. The programmable dental x-ray inscription system of claim 5, wherein said support tray further comprises a second recess for receiving a developed palate-size dental x-ray.

7. The programmable dental x-ray inscription system of claim 6, wherein said support tray further comprises a third recess for receiving a developed panoramic-size dental x-ray.

8. The programmable dental x-ray inscription system of claim 7, wherein said first, second and third recesses are formed at first, second and third depths in said support tray, wherein said second depth is greater than said third depth and said first depth is greater than said second and third depths.

9. The programmable dental x-ray inscription system of claim 5, wherein said housing has a housing access port, and said transport means comprises a motor driven transport mechanism operably associated with said programmed control means, for selectively transporting said support tray through said housing access port and between said first and second positions.

10. The programmable dental x-ray inscription system of claim 9, wherein said physical inscription means comprises:

light beam producing means for producing a light beam having a sufficient power density to form said physical inscriptions in said developed dental x-ray when said light beam is directed onto said developed dental x-ray;

light beam scanning means for scanning said light beam so as to form said physical inscriptions only within said portion of said perimetrical region of said developed dental x-ray.

11. The programmable dental x-ray inscription system of claim 10, wherein said selected patient identifying indicia comprises alphanumeric characters identifying said patient and the exposure date of said developed dental x-ray, wherein said data input means comprises an alphanumeric keypad for manually selecting said alphanumeric characters and said exposure data, and wherein said display means comprises a visual display device for visually displaying said selected alphanumeric characters.

12. The programmable dental x-ray inscription system of claim 9, wherein said portion of said perimetrical region represents a selected inscription field defined with respect to a cartesian coordinate system characterized by x, y and z coordinate axes, and wherein said light beam producing means comprises:

means for scanning said light beam along said x coordinate axis, means for scanning said light beam along said y coordinate axis, and means for focusing said scanned light beam along said z coordinate axis.

13. The programmable dental x-ray inscription system of claim 12, wherein said light beam is a laser beam.

14. A programmable dental x-ray inscription system, which comprises:

a housing positionable on a work surface;

data storage means disposed in said housing, for storing data representative of selected patient identifying indicia identifying a patient and the exposure date of a developed dental x-ray having a central region containing an x-ray image of said patient's teeth and a perimetrical border region about said central region;

a data communications port for receiving said data from a host device, for storage in said data storage means, said host device including data input means for providing said data to said data communications port and display means for displaying said selected patient identifying indicia;

physical inscription forming means disposed in said housing for forming, in a portion of said perimetrical region, physical inscriptions having a depth dimension extending into said developed dental x-ray and corresponding to said selected patient identifying indicia;

control means disposed in said housing and operably associated with said data storage means, said data communication port and said physical inscription forming means, for causing said data to be received through said data communications port and programmed in said data storage means, and for controlling the operation of said physical inscription forming means so as to form said physical inscriptions only within said portion of said perimetrical region and without adversely affecting said x-ray image in said central region.

15. The programmable dental x-ray inscription system of claim 14, further comprises dental x-ray support means for supporting said developed dental x-ray during the formation of said physical inscriptions in said developed dental x-ray, and transport means for transporting said dental x-ray support means between at least a first position and a second position, wherein said developed dental x-ray is placed in said dental x-ray support means when said dental x-ray support means is disposed in said first position, and wherein said physical inscriptions are formed when said dental x-ray is supported in said dental x-ray support means and said dental x-ray support means is disposed in said second position.

16. The programmable dental x-ray inscription system of claim 15, wherein said dental x-ray support means comprises a support tray having a first recess for receiving a developed periapical-size dental x-ray.

17. The programmable dental x-ray inscription system of claim 16, wherein said support tray further comprises a second recess for receiving a developed palate-size dental x-ray.

18. The programmable dental x-ray inscription system of claim 17, wherein said support tray further comprises a third recess for receiving a developed panoramic-size dental x-ray.

19. The programmable dental x-ray inscription system of claim 18, wherein said first, second and third recesses are formed at first, second and third depths in said support tray, wherein said second depth is greater than said third depth and said first depth is greater than said second and third depths.

20. The programmable dental x-ray inscription system of claim 19, wherein said housing has a housing access port, and said transport means comprises a motor driven transport mechanism operably associated with said programmed control means, for selectively transporting said support tray through said housing access port and between said first and second positions.

21. The programmable dental x-ray inscription system of claim 20, wherein said physical inscription means comprises:

light beam producing means for producing a light beam having a sufficient power density to form said physical inscriptions in said developed dental x-ray when said light beam is directed onto said developed dental x-ray;

light beam scanning means for scanning said laser beam so as to form physical inscriptions of said selected alphanumeric characters only within said portion of said perimetrical border region.

22. The programmable dental x-ray inscription system of claim 20, wherein said portion of said perimetrical border region represents a selected inscription field defined with respect to a Cartesian coordinate system characterized by x, y and z coordinate axes, and wherein said light beam producing means comprises:

means for scanning said light beam along said x coordinate axis, means for scanning said light beam along said y coordinate axis, and means for focusing said scanned light beam along said z coordinate axis.

23. The programmable dental x-ray inscription system of claim 22, wherein said light beam is a laser beam.

24. The programmable dental x-ray inscription system of claim 22, wherein said selected patient identifying indicia comprises alphanumeric characters representative of said patient's name, said exposure date, and indicia identifying one or more teeth represented in said developed dental x-ray.

25. A programmable dental x-ray inscription system, which comprises:

a housing positionable on a work surface;

data storage means disposed in said housing, for storing data including patient identifying data, x-ray size data, and inscription field data, said patient identifying data being representative of selected symbols identifying a patient and the exposure data of a developed dental x-ray having a central region containing an x-ray image of said patient's teeth and a perimetrical border region about said central region, said x-ray size data being representative of the physical size of said developed dental x-ray, and said inscription field data being representative of a selected inscription field defined along at least a portion of said perimetrical border region;

data input means disposed in said housing, for programming said data in said data storage means;

display means disposed in said housing, for displaying said selected symbols;

physical inscription forming means disposed in said housing, for forming within said selected inscription field, physical inscriptions having a depth dimension extending into said developed dental x-ray and corresponding to said selected symbols;

control means disposed in said housing and operably associated with said data storage means, said data input means, said display means and said physical inscription forming means, for causing said display means to display said selected symbols, and for controlling the operation of said physical inscription forming means so as to form said physical inscriptions only within said selected inscription field and without adversely affecting said x-ray image in said central region.

26. The programmable dental x-ray inscription system of claim 25, wherein said physical inscription forming means further comprises dental x-ray support means for supporting said developed dental x-ray during the formation of said physical inscriptions in said developed dental x-ray, and transport means for transporting said dental x-ray support means between at least a first position and a second position, wherein said developed dental x-ray is placed in said dental x-ray support means when said dental x-ray support means is disposed in said first position, and wherein said physical inscriptions are formed when said dental x-ray is supported in said dental x-ray support means and said dental x-ray support means is disposed in said second position.

27. The programmable dental x-ray inscription system of claim 26, wherein said dental x-ray support means comprises a support tray having a first recess for receiving a developed periapical-size dental x-ray.

28. The programmable dental x-ray inscription system of claim 27, wherein said support tray further comprises a second recess for receiving a developed palate-size dental x-ray.

29. The programmable dental x-ray inscription system of claim 28, wherein said support tray further comprises a third recess for receiving a developed panoramic-size dental x-ray.

30. The programmable dental x-ray inscription system of claim 29, wherein said first, second and third recesses are formed at first, second and third depths in said support tray, wherein said second depth is greater than said third depth and said first depth is greater than said second and third depths.

31. The programmable dental x-ray inscription system of claim 27, wherein said housing has a housing access port, and said transport means comprises a motor driven transport mechanism operably associated with said programmed control means, for selectively transporting said support tray through said housing access port and between said first and second positions.

32. The programmable dental x-ray inscription system of claim 31, wherein said inscription field is defined with respect to a Cartesian coordinate system characterized by x, y and z coordinate axes, and wherein said light beam producing means comprises:
    means for scanning said light beam along said x coordinate axis,
    means for scanning said light beam along said y coordinate axis, and
    means for focusing said scanned light beam along said z coordinate axis.

33. The programmable dental x-ray inscription system of claim 32, wherein said light beam comprises a laser beam.

34. The programmable dental x-ray inscription system of claim 31, wherein said physical inscription means comprises:
    light beam producing means for producing a light beam having a sufficient power density to form said physical inscriptions in said developed dental x-ray when said light beam is directed onto said developed dental x-ray;
    light beam scanning means for scanning said light beam so as to form said physical inscriptions of said selected symbols only within said selected inscription field of said developed dental x-ray.

35. The programmable dental x-ray inscription system of claim 34, wherein said alphanumeric characters provide indicia of said patient's name, said exposure date, and indicia identifying one or more teeth represented in said developed dental x-ray.

36. The programmable dental x-ray inscription system of claim 34, wherein said selected symbols comprise alphanumeric characters, and wherein said data input means comprises an alphanumeric keypad for manually selecting said alphanumeric characters, said x-ray size and said inscription field, and wherein said display means comprises a visual display device for visually displaying said selected alphanumeric characters.

37. The programmable dental x-ray inscription system of claim 36, which further comprises
    detection means for detecting the presence of said developed dental x-rays supported in said dental x-ray support means, and in response thereto automatically producing a dental x-ray detection signal.

38. The programmable dental x-ray inscription system of claim 37, wherein said detection means comprises an infrared light emitting diode transmitting an infrared light signal and an infrared light photoreceiving diode for detecting transmitted infrared light reflected off said developed dental x-ray disposed in said support means, and in response thereto producing said dental x-ray detection signal.

39. A programmable dental x-ray inscription system, which comprises:
    a housing positionable on a work surface;
    data storage means disposed in said housing, for storing data including patient identifying data, x-ray size data, and inscription field data,
    said patient identifying data being representative of selected symbols identifying a patient and the exposure date of a developed dental x-ray having a central region containing an x-ray image of said patient's teeth and a perimetrical border region about said central region,
    said x-ray size data being representative of the physical size of said developed dental x-ray, and
    said inscription field data being representative of a selected inscription field defined along at least a portion of said perimetrical border region;
    a data communications port for receiving said data from a host device for storage in said data storage means, said host device including data input means for providing said patient identifying data, said inscription field data and said x-ray size data to said data communications port, and display means for displaying said selected symbols;
    physical inscription forming means disposed in said housing, for forming within said selected inscription field, physical inscriptions having a depth dimension extending into said developed dental x-ray and corresponding to said selected symbols;
    control means disposed in said housing and operably associated with said data storage means, said data communication port and said physical inscription forming means, for causing said data to be received through said data communications port and programmed in said data storage means, and for controlling the operation of said physical inscription forming means so as to form said physical inscriptions only within said selected inscription field and without adversely affecting said x-ray image in said central region.

40. The programmable dental x-ray inscription system of claim 39, further comprises
    dental x-ray support means for supporting said developed dental x-ray during the formation of said physical inscriptions in said developed dental x-ray, and
    transport means for transporting said dental x-ray support means between at least a first position and a second position, wherein said developed dental x-ray is placed in said dental x-ray support means when said dental x-ray support means is disposed in said first position, and wherein said physical inscriptions are formed when said dental x-ray is supported in said dental x-ray support means and said dental x-ray support means is disposed in said second position.

41. The programmable dental x-ray inscription system of claim 40, wherein said dental x-ray support means comprises a support tray having a first recess for receiving a developed dental x-ray of periapical-size.

42. The programmable dental x-ray inscription system of claim 41, wherein said support tray further comprises a second recess for receiving a developed dental x-ray of palate-size.

43. The programmable dental x-ray inscription system of claim 42, wherein said support tray further comprises a third recess for receiving a developed dental x-ray of panoramic-size.

44. The programmable dental x-ray inscription system of claim 43, wherein said first, second and third recesses are formed at first, second and third depths in said support tray, wherein said second depth is greater than said third depth and said first depth is greater than said second and third depths.

45. The programmable dental x-ray inscription system of claim 44, wherein said housing has a housing access port, and said transport means comprises a motor driven transport mechanism operably associated with said programmed control means, for selectively transporting said support tray through said housing access port and between said first and second positions.

46. The programmable dental x-ray inscription system of claim 45, wherein said physical inscription means comprises:
   light beam producing means for producing a light beam having a sufficient power density to form said physical inscriptions in said developed dental x-ray when said light beam is directed onto said developed dental x-ray;
   laser beam scanning means for scanning said light beam so as to form said physical inscriptions of said selected symbols only within said selected inscription field.

47. The programmable dental x-ray inscription system of claim 46, wherein said light beam is a laser beam.

48. The programmable dental x-ray inscription system of claim 47, wherein said inscription field is defined within a cartesian coordinate system characterized by x, y and z coordinate axes, and wherein and said laser beam scanning means comprises
   means for scanning said laser beam along said x coordinate axis,
   means for scanning said laser beam along said y coordinate axis, and
   means for focusing said scanned laser beam along said z coordinate axis.

49. The programmable dental x-ray inscription system of claim 48, wherein said selected symbols provide indicia of said patient's name, said exposure date, and indicia identifying one or more teeth represented in said developed dental x-ray.

* * * * *